US012236854B2

(12) United States Patent
Song

(10) Patent No.: US 12,236,854 B2
(45) Date of Patent: Feb. 25, 2025

(54) DISPLAY DEVICE

(71) Applicant: Samsung Display Co., Ltd., Yongin-Si (KR)

(72) Inventor: Heerim Song, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/579,835

(22) Filed: Jan. 20, 2022

(65) Prior Publication Data

US 2022/0335888 A1 Oct. 20, 2022

(30) Foreign Application Priority Data

Apr. 20, 2021 (KR) ........................ 10-2021-0051405

(51) Int. Cl.
*G09G 3/3208* (2016.01)

(52) U.S. Cl.
CPC ....... *G09G 3/3208* (2013.01); *G09G 2310/08* (2013.01); *G09G 2320/0238* (2013.01); *G09G 2330/021* (2013.01); *G09G 2340/0435* (2013.01)

(58) Field of Classification Search
None
See application file for complete search history.

(56) References Cited

U.S. PATENT DOCUMENTS 9,437,168 B2 9/2016 Her
9,466,652 B2 10/2016 Kim
10,354,585 B2 7/2019 Lin et al.
10,621,922 B2 4/2020 Oh et al.
2016/0111055 A1* 4/2016 Na ........................ G09G 3/3666 345/94
2017/0249917 A1* 8/2017 Chen .................... G09G 3/3614
2018/0350318 A1* 12/2018 Lee .......................... G09G 3/20
2020/0349879 A1 11/2020 Park et al.
2021/0248960 A1* 8/2021 Lee ...................... G09G 3/3233
2021/0407427 A1* 12/2021 Lee ...................... G09G 3/3233
2022/0223107 A1* 7/2022 Chen .................... G09G 3/3233

FOREIGN PATENT DOCUMENTS

KR 1020180011434 A 2/2018
KR 102038076 B1 10/2019
KR 102174323 B1 11/2020
KR 102179312 B1 11/2020
KR 1020200128289 A 11/2020

* cited by examiner

*Primary Examiner* — Andre L Matthews
(74) *Attorney, Agent, or Firm* — CANTOR COLBURN LLP

(57) ABSTRACT

A display device includes a display panel including a pixel, and a panel driver driving the display panel. The pixel includes first to fifth transistors. The first transistor is connected between a power line and the light-emitting element. The second transistor is connected between a data line and the first transistor and receives a first scan signal. The third transistor is connected between the first transistor and a first node and receives a second scan signal. The fourth transistor is connected between the first node and an initialization line. The fifth transistor is connected between the first transistor and the first node and receives a fourth scan signal. The first and fourth scan signals are simultaneously activated, and a period of the second scan signal is smaller than or equal to a period of the fourth scan signal.

20 Claims, 15 Drawing Sheets

DISPLAY DEVICE

This application claims priority to Korean Patent Application No. 10-2021-0051405, filed on Apr. 20, 2021, and all the benefits accruing therefrom under 35 U.S.C. § 119, the content of which in its entirety is herein incorporated by reference.

BACKGROUND

1. Field

Embodiments of the disclosure described herein relate to a display device, and more particularly, relate to a display device with improved display quality.

2. Description of the Related Art

A light-emitting display device among display devices displays an image by using a light-emitting diode that generates a light through the recombination of electrons and holes. The light-emitting display device may be driven with a low power while providing a fast response speed.

The organic light-emitting display device typically includes pixels connected with data lines and scan lines. Each of the pixels generally includes a light-emitting diode, and a circuit unit for controlling the amount of current flowing to the light-emitting diode. In response to a data signal, the circuit unit controls the amount of current that flows from a first driving voltage to a second driving voltage through the light-emitting diode, such that a light of luminance corresponding to the amount of current flowing is generated through the light-emitting diode.

SUMMARY

Embodiments of the disclosure provide a display device in which decrease in display quality due to a change of a driving frequency is effectively prevented.

According to an embodiment, a display device includes a display panel including a pixel, and a panel driver which drives the display panel at a first panel frequency in a first driving mode and drives the display panel at a second panel frequency lower than the first panel frequency in a second driving mode. In such an embodiment, the pixel includes a light-emitting element including a cathode and an anode, and first to fifth transistors. In such an embodiment, the first transistor is connected between a power line and the anode of the light-emitting element, the second transistor is connected between a data line and a first electrode of the first transistor and receives a first scan signal. In such an embodiment, the third transistor is connected between a second electrode of the first transistor and a first node and receives a second scan signal. In such an embodiment, the fourth transistor is connected between the first node and an initialization line and receives a third scan signal. In such an embodiment, the fifth transistor is connected between a third electrode of the first transistor and the first node and receives a fourth scan signal. In such an embodiment, the first and fourth scan signals are simultaneously activated in the second driving mode, and a period of the second scan signal is smaller than or equal to a period of the fourth scan signal in the second driving mode.

According to an embodiment, a display device includes a display panel that includes a first display area and a second display area adjacent to the first display area, and a panel driver which operates the first display area at a first driving frequency and operates the second display area at a second driving frequency different from the first driving frequency. In such an embodiment, the panel driver includes a first scan driver which operates at a first frequency, and a second scan driver which operates at a second frequency higher than the first frequency. In such an embodiment, the first frequency is equal to the first driving frequency.

BRIEF DESCRIPTION OF THE DRAWINGS

The above and other features of the disclosure will become apparent by describing in detail embodiments thereof with reference to the accompanying drawings, in which.

DETAILED DESCRIPTION

Figure 1:
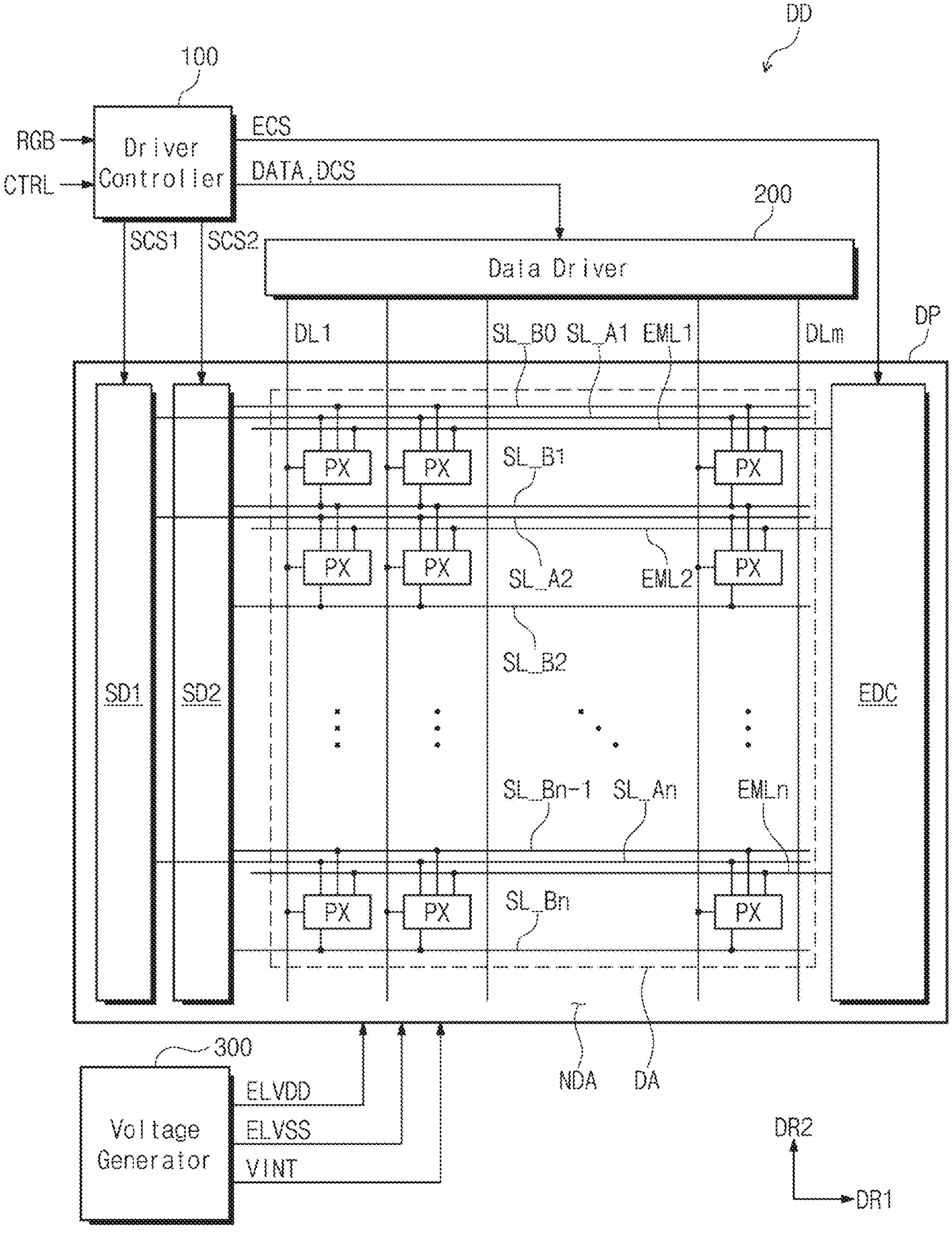
FIG. 1 is a block diagram of a display device according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In the specification, the expression that a first component (or region, layer, part, etc.) is "on", "connected with", or "coupled with" a second component means that the first component is directly on, connected with, or coupled with the second component or means that a third component is interposed therebetween.

The same reference numerals refer to the same components. Also, in drawings, thicknesses, proportions, and dimensions of components may be exaggerated to describe the technical features effectively. "Or" means "and/or." As used herein, the term "and/or" includes any and all combinations of one or more of the associated listed items.

Although the terms "first", "second", etc. may be used to describe various components, the components should not be construed as being limited by the terms. The terms are only used to distinguish one component from another component. For example, without departing from the scope and spirit of the invention, a first component may be referred to as a second component, and similarly, the second component may be referred to as the second component. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise.

Also, relative terms "under", "below", "on", "above", etc. will be used to describe the correlation of components illustrated in drawings. The terms that are relative in concept will be described on the basis of a direction shown in drawings. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

It will be further understood that the terms "comprises", "includes", "have", etc. specify the presence of stated features, numbers, steps, operations, elements, components, or a combination thereof but do not preclude the presence or addition of one or more other features, numbers, steps, operations, elements, components, or a combination thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical terms and scientific terms) used in the specification have the same meaning as commonly understood by one skilled in the art to which the disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the disclosure will be described in detail with reference to accompanying drawings.

FIG. 1 is a block diagram of a display device according to an embodiment of the invention.

Referring to FIG. 1, an embodiment of a display device DD may be a device that is activated based on an electrical signal to display an image. The display device DD may be applied to an electronic device such as a smart watch, a notebook, a computer, or a smart television.

The display device DD includes a display panel DP, a panel driver, and a driver controller 100. In one embodiment, for example, the panel driver includes a data driver 200, a scan driver (SD1, SD2), a light-emitting driver EDC, and a voltage generator 300.

The driver controller 100 receives an image signal RGB and a control signal CTRL. The driver controller 100 generates an image data signal DATA by converting a data format of the image signal RGB in compliance with the specification for an interface with the data driver 200. The driver controller 100 outputs a scan control signal (SCS1, SCS2) and a data control signal DCS. The scan control signal may include a first scan control signal SCS1 and a second scan control signal SCS2.

The data driver 200 receives the data control signal DCS and the image data signal DATA from the driver controller 100. The data driver 200 converts the image data signal DATA into data signals and outputs the data signals to a plurality of data lines DL1 to DLm to be described later. The data signals may be analog voltages corresponding to a gray scale value of the image data signal DATA.

The scan driver (SD1, SD2) includes a first scan driver SD1 and a second scan driver SD2. The first scan driver SD1 receives the first scan control signal SCS1 from the driver controller 100, and the second scan driver SD2 receives the second scan control signal SCS2 from the driver controller 100. The first scan driver SD1 may output low-frequency scan signals in response to the first scan control signal SCS1, and the second scan driver SD2 may output high-frequency scan signals in response to the second scan control signal SCS2.

The voltage generator 300 generates voltages used for an operation of the display panel DP. In an embodiment, the voltage generator 300 generates a first driving voltage ELVDD, a second driving voltage ELVSS, and an initialization voltage VINT.

The display panel DP includes low-frequency scan lines SL_A1 to SL_An, high-frequency scan lines SL_B0 to SL_Bn, light-emitting control lines EML1 to EMLn, the data lines DL1 to DLm, and pixels PX. The low-frequency scan lines SL_A1 to SL_An, the high-frequency scan lines SL_B0 to SL_Bn, the light-emitting control lines EML1 to EMLn, the data lines DL1 to DLm, and the pixels PX may be disposed in a display area DA. The low-frequency scan lines SL_A1 to SL_An, the high-frequency scan lines SL_B0 to SL_Bn, and the light-emitting control lines EML1 to EMLn extend in a first direction DR1. The low-frequency scan lines SL_A1 to SL_An, the high-frequency scan lines SL_B0 to SL_Bn, and the light-emitting control lines EML1 to EMLn are arranged to be spaced from each other in a second direction DR2. The second direction DR2 may be a direction intersecting the first direction DR1. The data lines DL1 to DLm extend in the second direction DR2 and are arranged to be spaced apart from each other in the first direction DR1.

The pixels PX are electrically connected with the low-frequency scan lines SL_A1 to SL_An, the high-frequency scan lines SL_B0 to SL_Bn, the light-emitting control lines EML1 to EMLn, and the data lines DL1 to DLm. Each of the pixels PX may be electrically connected with three scan lines. In one embodiment, for example, as illustrated in FIG. 1, a first row of pixels may be connected with the first low-frequency scan line SL_A1, the dummy high-frequency scan line SL_B0, and the first high-frequency scan line SL_B1. In such an embodiment, a second row of pixels may be connected with the second low-frequency scan line SL_A2, the first high-frequency scan line SL_B1, and the second high-frequency scan line SL_B2.

The first and second scan drivers SD1 and SD2 may be disposed in a non-display area NDA of the display panel DP. The first scan driver SD1 outputs low-frequency scan signals to the low-frequency scan lines SL_A1 to SL_An in response to the first scan control signal SCS1, and the second scan driver SD2 outputs high-frequency scan signals to the high-frequency scan lines SL_B0 to SL_Bn in response to the second scan control signal SCS2. In such an embodiment, the first scan driver SD1 may drive the low-frequency scan lines SL_A1 to SL_An at a first frequency in response to the first scan control signal SCS1, and the second scan driver SD2 may drive the high-frequency scan lines SL_B0 to SL_Bn at a second frequency in response to the second scan control signal SCS2. Here, the second frequency may be higher than the first frequency.

The light-emitting driver EDC receives a light-emitting driving signal ECS from the driver controller 100. The light-emitting driver EDC may output light-emitting control signals to the light-emitting control lines EML1 to EMLn in response to the light-emitting driving signal ECS.

The light-emitting driver EDC may be disposed in the non-display area NDA of the display panel DP. In one embodiment, for example, the first and second scan drivers SD1 and SD2 may be disposed adjacent to a first side of the display area DA, and the light-emitting driver EDC may be disposed adjacent to a second side of the display area DA. In such an embodiment, the display area DA may be provided between the first and second scan drivers SD1 and SD2 and the light-emitting driver EDC. However, the disclosure is not limited thereto. In one alternative embodiment, for example, the light-emitting driver EDC may be disposed adjacent to the first side of the display area DA together with the first and second scan drivers SD1 and SD2. Alternatively, the first scan driver SD1 may be disposed adjacent to the first side of the display area DA, and the second scan driver SD2 and the light-emitting driver EDC may be disposed adjacent to the second side of the display area DA.

Each of the pixels PX includes a light-emitting element ED (refer to FIG. 2) and a pixel circuit unit PXC (refer to FIG. 2) for controlling the light emission of the light-emitting element ED. The pixel circuit unit PXC may include a plurality of transistors and a capacitor. At least one selected from the first and second scan drivers SD1 and SD2 and the light-emitting driver EDC may include transistors that are formed through a same process as the pixel circuit unit PXC.

Each of the pixels PX may receive the first driving voltage ELVDD, the second driving voltage ELVSS, and the initialization voltage VINT from the voltage generator 300.

Figure 2:
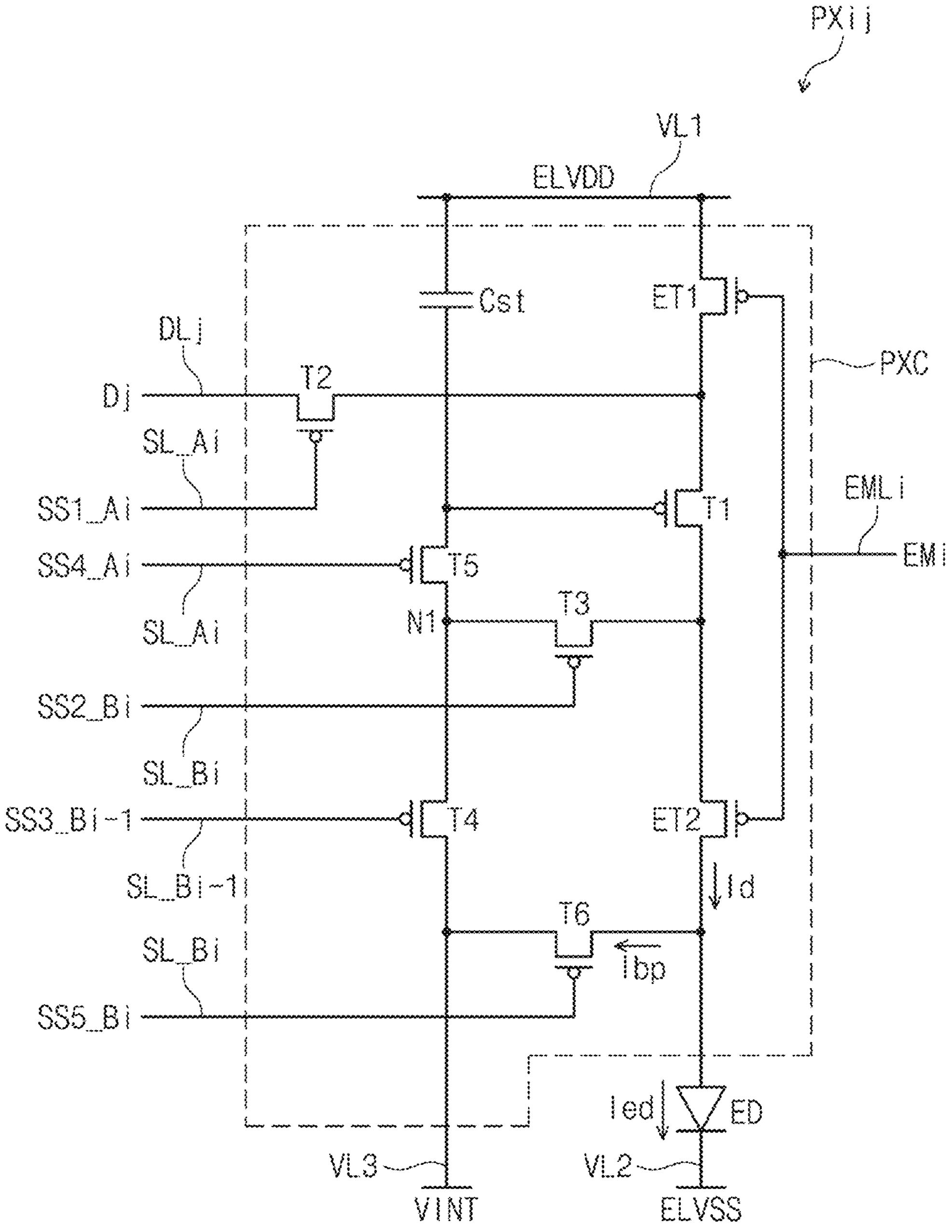
FIG. 2 is a circuit diagram of a pixel according to an embodiment of the disclosure.
Figure 3:
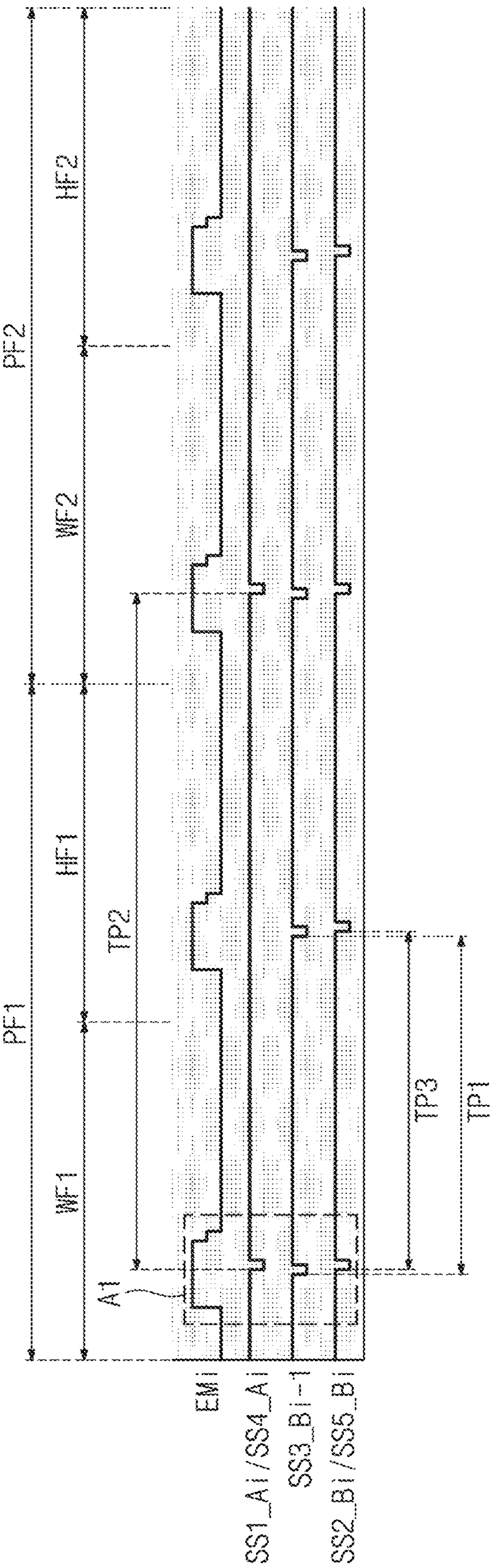
FIG. 3 is a signal timing diagram for describing an operation of a pixel of FIG. 2.
Figure 4:
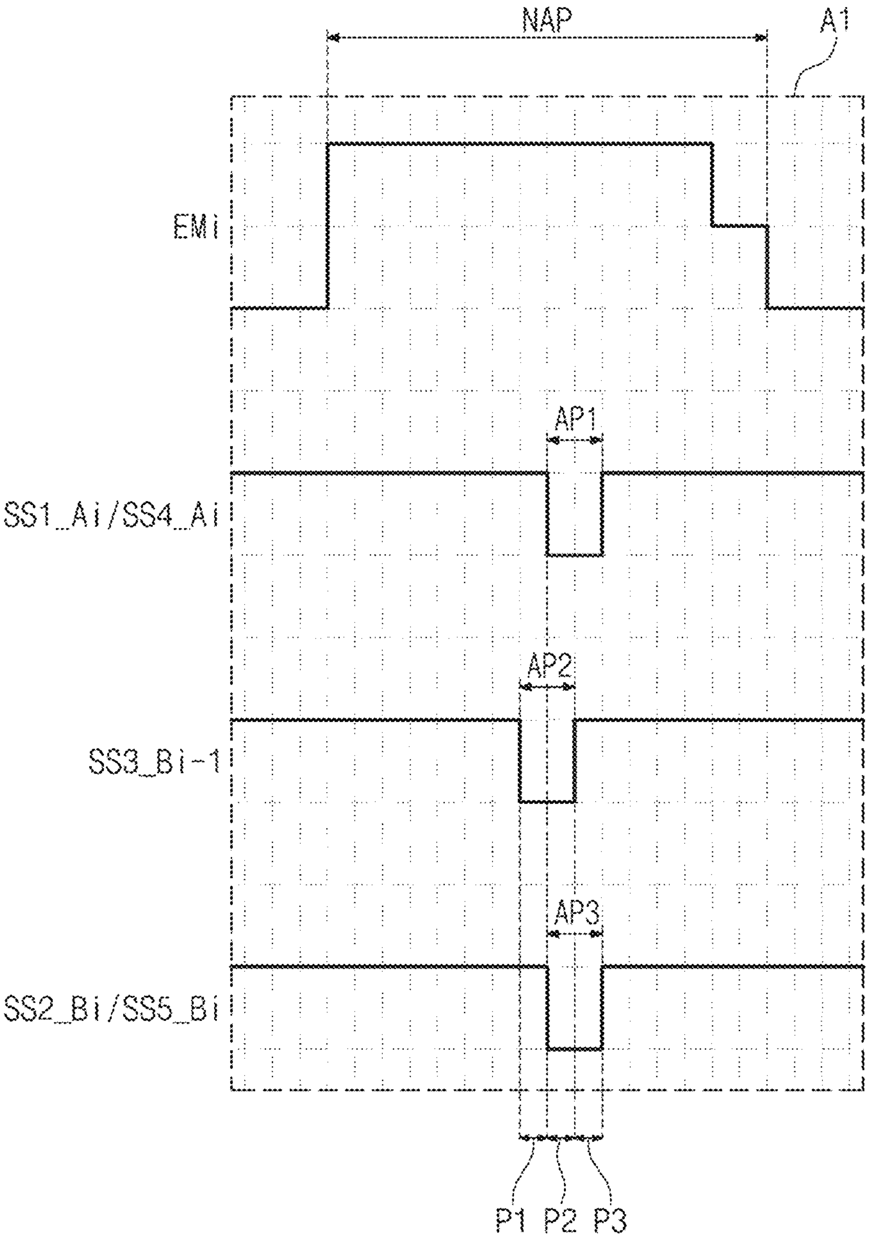
FIG. 4 is an enlarged view of portion A1 illustrated in FIG. 3.

FIG. 2 is a circuit diagram of a pixel according to an embodiment of the disclosure. FIG. 3 is a signal timing diagram for describing an operation of a pixel of FIG. 2, and FIG. 4 is an enlarged view of portion A1 illustrated in FIG. 3.

An equivalent circuit diagram of an embodiment of one pixel PXij of the pixels PX in FIG. 1 is illustrated in FIG. 2. Hereinafter, a circuit structure of the pixel PXij will be described in detail. The pixels PX have a same structure as each other, and thus, any repetitive detailed description of other pixels will be omitted to avoid redundancy.

Referring to FIG. 2, the pixel PXij is connected with a j-th data line DLj (hereinafter referred to as a "current data line") of the data lines DL1 to DLm, an i-th low-frequency scan line SL_Ai (hereinafter referred to as a "current low-frequency scan line") of the low-frequency scan lines SL_A1 to SL_An, an (i−1)-th high-frequency scan line SL_Bi−1 (hereinafter referred to as a "previous high-frequency scan line") of the high-frequency scan lines SL_B0 to SL_Bn, an i-th high-frequency scan line SL_Bi (hereinafter referred to as a "current high-frequency scan line") of the high-frequency scan lines SL_B0 to SL_Bn, and an i-th light-emitting control line EMLi (hereinafter referred to as a "current light-emitting control line") of the light-emitting control lines EML1 to EMLn. Herein, i and j are natural numbers.

The pixel PXij includes the light-emitting element ED and the pixel circuit unit PXC. The pixel circuit unit PXC includes first to sixth transistors T1, T2, T3, T4, T5, and T6, first and second light-emitting control transistors ET1 and ET2, and one capacitor Cst. Each of the first to sixth transistors T1, T2, T3, T4, T5, and T6 and the first and second light-emitting control transistors ET1 and ET2 may be a transistor having a low-temperature polycrystalline silicon ("LTPS") semiconductor layer. The first to sixth transistors T1 to T6 may be implemented with transistors of a same type as each other. In one embodiment, for example, each of the first to sixth transistors T1 to T6 may be a P-type transistor, and each of the first and second light-emitting control transistors ET1 and ET2 may also be a P-type transistor. A configuration of the pixel circuit unit PXC according to the disclosure is not limited to the embodiment illustrated in FIG. 2. The pixel circuit unit PXC in FIG. 2 merely shows one embodiment, and the configuration of the pixel circuit unit PXC may be variously modified and carried out. In one alternative embodiment, for example, each of the first to sixth transistors T1 to T6 may be an N-type transistor, and each of the first and second light-emitting control transistors ET1 and ET2 may also be an N-type transistor.

The first transistor T1 includes a first electrode connected with a first voltage line VL1 through the first light-emitting control transistor ET1, a second electrode electrically connected with an anode of the light-emitting element ED through the second light-emitting control transistor ET2, and a third electrode connected with a first end of the capacitor Cst. The first voltage line VL1 may transfer the first driving voltage ELVDD to the pixel PXij. The first transistor T1 may be supplied with a data signal Dj, which the current data line DLj transfers, based on a switching operation of the second transistor T2 and may supply a driving current Id to the light-emitting element ED.

The second transistor T2 includes a first electrode connected with the current data line DLj, a second electrode connected with the first electrode of the first transistor T1, and a third (or gate) electrode which receives a first scan signal SS1_Ai. The third electrode of the second transistor T2 may be electrically connected with the current low-frequency scan line SL_Ai. Accordingly, the second transistor T2 may receive an i-th low-frequency scan signal transferred from the current low-frequency scan line SL_Ai as the first scan signal SS1_Ai. The second transistor T2 may be turned on based on the first scan signal SS1_Ai and thus may transfer the data signal Dj transferred from the current data line DLj to the first electrode to the first transistor T1.

The third transistor T3 includes a first electrode connected with a first node N1, a second electrode connected with the second electrode of the first transistor T1, and a third electrode which receives a second scan signal SS2_Bi. The third electrode of the third transistor T3 may be electrically connected with the current high-frequency scan line SL_Bi. Accordingly, the third transistor T3 may receive an i-th high-frequency scan signal transferred from the current high-frequency scan line SL_Bi as the second scan signal SS2_Bi. The third transistor T3 may be turned on based on the second scan signal SS2_Bi and thus may electrically connect the first node N1 and the second electrode of the first transistor T1.

The fourth transistor T4 includes a first electrode connected with the first node N1, a second electrode connected with a third voltage line VL3, and a third electrode which receives a third scan signal SS3_Bi−1. The third voltage line VL3 may transfer the initialization voltage VINT to the pixel PXij. The third electrode of the fourth transistor T4 may be electrically connected with the previous high-frequency scan line SL_Bi−1. Accordingly, the fourth transistor T4 may receive an (i−1)-th high-frequency scan signal transferred from the previous high-frequency scan line SL_Bi−1 as the third scan signal SS3_Bi−1. The fourth transistor T4 may be turned on based on the third scan signal SS3_Bi−1 and thus may transfer the initialization voltage VINT to the first node N1. In this case, the first node N1 may be initialized, that is, an initialization operation for the first node N1 may be performed.

The fifth transistor T5 includes a first electrode connected with the third electrode of the first transistor T1, a second electrode connected with the first node N1, and a third electrode which receives a fourth scan signal SS4_Ai. The third electrode of the fifth transistor T5 may be electrically connected with the current low-frequency scan line SL_Ai. Accordingly, the fifth transistor T5 may receive the i-th low-frequency scan signal transferred from the current low-frequency scan line SL_Ai as the fourth scan signal SS4_Ai. The fifth transistor T5 may be turned on based on the fourth scan signal SS4_Ai and thus may electrically connect the first node N1 and the third electrode of the first transistor T1.

The first end of the capacitor Cst is connected with the third electrode of the first transistor T1, and a second end of the capacitor Cst is connected with the first voltage line VL1.

The first light-emitting control transistor ET1 includes a first electrode connected with the first voltage line VL1, a second electrode connected with the first electrode of the first transistor T1, and a third electrode connected with the current light-emitting control line EMLi.

The second light-emitting control transistor ET2 includes a first electrode connected with the second electrode of the first transistor T1, a second electrode connected with the anode of the light-emitting element ED, and a third electrode connected with the current light-emitting control line EMLi.

The first and second light-emitting control transistors ET1 and ET2 are simultaneously turned on based on a light-emitting control signal EMi transferred through the current light-emitting control line EMLi. The first driving voltage ELVDD applied through the turned-on first light-emitting control transistor ET1 may be transferred to the light-emitting element ED through the first transistor T1 and the second light-emitting control transistor ET2.

The sixth transistor T6 includes a first electrode connected with the second electrode of the fourth transistor T4, a second electrode connected with the second electrode of the second light-emitting control transistor ET2, and a third electrode which receives a fifth scan signal SS5_Bi. The third electrode of the sixth transistor T6 may be electrically connected with the current high-frequency scan line SL_Bi. Accordingly, the sixth transistor T6 may receive the i-th high-frequency scan signal transferred from the current high-frequency scan line SL_Bi as the fifth scan signal SS5_Bi. When the sixth transistor T6 is turned on by the fifth scan signal SS5_Bi, the anode of the light-emitting element ED may be initialized to the initialization voltage VINT, that is, an initialization operation for the anode of the light-emitting element ED may be performed.

The anode of the light-emitting element ED may be connected with the second electrode of the second light-emitting control transistor ET2 and the second electrode of the sixth transistor T6, and a cathode of the light-emitting element ED may be connected with a second voltage line VL2. The second voltage line VL2 may transfer the second driving voltage ELVSS to the pixel PXij.

The first and fourth scan signals SS1_Ai and SS4_Ai may be low-frequency scan signals output from the first scan driver SD1 for operating at the first frequency, and the second, third, and fifth scan signals SS2_Bi, SS3_Bi−1, and SS5_Bi may be high-frequency scan signals output from the second scan driver SD2 for operating at the second frequency. In one embodiment, for example, each of the first and fourth scan signals SS1_Ai and SS4_Ai may be the i-th low-frequency scan signal supplied from the current low-frequency scan line SL_Ai. Each of the second and fifth scan signals SS2_Bi and SS5_Bi may be the i-th high-frequency scan signal supplied from the current high-frequency scan line SL_Bi. However, the disclosure is not limited thereto. In one alternative embodiment, for example, the first and fourth scan signals SS1_Ai and SS4_Ai may be signals that are supplied from different low-frequency scan lines, and the second and fifth scan signals SS2_Bi and SS5_Bi may be signals that are supplied from different high-frequency scan lines.

Referring to FIGS. 1, 3, and 4, an operating frequency of the display panel DP may be defined by using a panel frequency. The panel driver may drive the display panel DP at a first panel frequency in a first driving mode and may drive the display panel DP at a second panel frequency in a second driving mode. The second panel frequency may be lower than the first panel frequency. In one embodiment, for example, the second panel frequency may be a frequency of about 15 hertz (Hz) or about 30 Hz, and the first panel frequency may be a frequency of about 60 Hz, about 120 Hz, or about 240 Hz.

In the first driving mode, the first scan driver SD1 operates at the first frequency, and the second scan driver SD2 operates at the second frequency equal to or higher than the first frequency. Here, the first frequency may have the same frequency as the first panel frequency, and the second frequency may have a frequency equal to or higher than the first panel frequency. In one embodiment, for example, where the first panel frequency is about 120 Hz, the first frequency may be about 120 Hz, and the second frequency may be about 120 Hz or about 240 Hz.

In the second driving mode, the first scan driver SD1 operates at the first frequency, and the second scan driver SD2 operates at the second frequency higher than the first frequency. Here, the first frequency may have the same frequency as the second panel frequency, and the second frequency may have a frequency higher than the second panel frequency. In one embodiment, for example, where the second panel frequency is about 30 Hz, the first frequency may be about 30 Hz, and the second frequency may be about 60 Hz.

In the second driving mode, the display panel DP may display an image during a plurality of panel frames. For convenience of description, two frames (i.e., first and second panel frames PF1 and PF2) being successive from among the panel frames are illustrated in FIG. 3. Each of the panel frames includes a write frame and a holding frame. In one embodiment, for example, the first panel frame PF1 includes a first write frame WF1 and a first holding frame HF1, and the second panel frame PF2 includes a second write frame WF2 and a second holding frame HF2.

Each of the first to fifth scan signals SS1_Ai, SS2_Bi, SS3_Bi−1, SS4_Ai, and SS5_Bi may be activated during the first and second write frames WF1 and WF2. During the first and second holding frames HF1 and HF2, the second, third, and fifth scan signals SS2_Bi, SS3_Bi−1, and SS5_Bi may be activated, and the first and fourth scan signals SS1_Ai and SS4_Ai may be deactivated. The light-emitting control signal EMi may be deactivated during a partial period of each of the first and second write frames WF1 and WF2 and during a partial period of each of the first and second holding frames HF1 and HF2. In the second driving mode, the second, third, and fifth scan signals SS2_Bi, SS3_Bi−1, and SS5_Bi and the light-emitting control signal EMi may be output at the second frequency, and the first and fourth scan signals SS1_Ai and SS4_Ai may be output at the first frequency lower than the second frequency. Accordingly, in the second driving mode, the period TP1 of the second scan signal SS2_Bi is smaller than the period TP2 of the fourth scan signal SS4_Ai.

Also, scan signals that are output from the same scan driver may have a same period as each other. That is, the period TP1 of the second scan signal SS2_Bi may be equal to the period TP3 of the third scan signal SS3_Bi−1, and the period TP2 of the fourth scan signal SS4_Ai may be equal to the period TP2 of the first scan signal SS1_Ai.

Referring to FIGS. 2 and 4, in the first write frame WF1, the light-emitting control signal EMi may include an inactive period NAP. The inactive period NAP of the light-emitting control signal EMi may be defined as a non-emission period where the light-emitting element ED does not emit a light, and an active period of the light-emitting control signal EMi may be defined as an emission period where the light-emitting element ED emits a light. In one embodiment, for example, the light-emitting control signal EMi may have a high level during the inactive period NAP. However, the disclosure is not limited thereto. In one alternative embodiment, for example, where the first and second light-emitting control transistors ET1 and ET2 are N-type transistors, the light-emitting control signal EMi may have a low level during the inactive period NAP.

During the first write frame WF1, the first to fifth scan signals SS1_Ai, SS2_Bi, SS3_Bi−1, SS4_Ai, and SS5_Bi may be activated within the inactive period NAP of the light-emitting control signal EMi. The first and fourth scan signals SS1_Ai and SS4_Ai may be simultaneously activated, and active periods of the first and fourth scan signals SS1_Ai and SS4_Ai are defined as a first active period AP1. An active period of the third scan signal SS3_Bi−1 is defined as a second active period AP2. The second and fifth scan signals SS2_Bi and SS5_Bi may be simultaneously activated, and active periods of the second and fifth scan signals SS2_Bi and SS5_Bi are defined as a third active period AP3. Each of the first to third active periods AP1 to AP3 may overlap the inactive period NAP of the light-emitting control signal EMi.

In an embodiment, as shown in FIG. 4, the second active period AP2 may precede (or may be activated/generated prior to) the first and third active periods AP1 and AP3, and the second active period AP2 and the first and third active periods AP1 and AP3 may partially overlap each other. The first and third active periods AP1 and AP3 may fully overlap each other. A width of the first active period AP1 may be equal to a width of the third active period AP3. A part of the second active period AP2, which does not overlap the first and third active periods AP1 and AP3, may be defined as a first period P1, a part of the second active period AP2, which overlaps the first and third active periods AP1 and AP3, may be defined as a second period P2, and a part of the first active period AP1, which does not overlap the second active period AP2, may be defined as a third period P3. That is, during the first period P1, the third scan signal SS3_Bi−1 is activated, and the first, second, fourth, and fifth scan signals SS1_Ai, SS2_Bi, SS4_Ai, and SS5_Bi are deactivated. The first to fifth scan signals SS1_Ai, SS2_Bi, SS3_Bi−1, SS4_Ai, and SS5_Bi are activated during the second period P2. Also, during the third period P3, the first, second, fourth, and fifth scan signals SS1_Ai, SS2_Bi, SS4_Ai, and SS5_Bi are activated, and the third scan signal SS3_Bi−1 is deactivated.

When the third scan signal SS3_Bi−1 of the low level is provided to the pixel PXij in the first period P1, the fourth transistor T4 is turned on in response to the third scan signal SS3_Bi−1. The initialization voltage VINT is transferred to the first node N1 through the fourth transistor T4 turned on, and the first node N1 is initialized by the initialization voltage VINT.

Next, in the second and third periods P2 and P3, the second scan signal SS2_Bi of the low level and the fourth scan signal SS4_Ai of the low level are supplied to the pixel PXij. In this case, the third transistor T3 is turned on by the second scan signal SS2_Bi, and the fifth transistor T5 is turned on by the fourth scan signal SS4_Ai. The first transistor T1 is diode-connected by the third and fifth transistors T3 and T5 turned on and is forward-biased. In the second and third periods P2 and P3, the second transistor T2 is turned on by the first scan signal SS1_Ai of the low level. In this case, the data signal Dj supplied from the current data line DLj is applied to the first electrode of the first transistor T1. When a potential of the first electrode of the first transistor T1 is defined as a data voltage (Vd), a voltage obtained by subtracting a threshold voltage (Vth) of the first transistor T1 from the data voltage (Vd), that is, a compensation voltage (Vd−Vth) is applied to the third electrode of the first transistor T1 by the third and fifth transistors T3 and T5 turned on. That is, a potential of the third electrode of the first transistor T1 may be the compensation voltage (Vd−Vth).

As the first driving voltage ELVDD and the compensation voltage (Vd−Vth) are respectively applied to opposite ends of the capacitor Cst, charges corresponding to a voltage difference of the opposite ends may be stored in the capacitor Cst.

In the second and third periods P2 and P3, the sixth transistor T6 is turned on by the fifth scan signal SS5_Bi of the low level. A part of the driving current Id may be drained through the sixth transistor T6 as a bypass current Ibp.

In the case where the light-emitting element ED emits a light under the condition that a minimum current of the first transistor T1 for displaying a black image flows as a driving current, a black image may not be normally displayed. Accordingly, in an embodiment, the sixth transistor T6 of the pixel PXij may drain a part of the minimum current of the first transistor T1 to a current path, which is different from a current path to the light-emitting element ED, as the bypass current Ibp. Here, the minimum current of the first transistor T1 means a current flowing under the condition that a gate-source voltage of the first transistor T1 is smaller than the threshold voltage (Vth), that is, the first transistor T1 is turned off. As a minimum driving current (e.g., a current of 10 picoampere (pA) or less) is transferred to the light-emitting element ED, with the first transistor T1 turned off, an image of black luminance may be expressed. When the minimum driving current for displaying a black image flows, the influence of a bypass transfer of the bypass current Ibp may be great. However, when a large driving current for displaying an image such as a normal image or a white image flows, there may be almost no influence of the bypass current Ibp. Accordingly, when a driving current for displaying a black image flows, a light-emitting current Ied of the light-emitting element ED, which corresponds to a result of subtracting the bypass current Ibp drained through the sixth transistor T6 from the driving current Id, may have a minimum current amount to such an extent as to accurately express a black image. Accordingly, a contrast ratio may be improved by implementing an accurate black luminance image by using the sixth transistor T6.

Afterwards, when the light-emitting control signal EMi transitions from the high level to the low level, that is, in the case of entering the active period, the first and second light-emitting control transistors ET1 and ET2 are turned on by the light-emitting control signal EMi of the low level. In this case, the driving current Id is generated based on a voltage difference between a potential of the third electrode of the first transistor T1 and the first driving voltage ELVDD, and the driving current Id is supplied to the light-emitting element ED through the second light-emitting control transistor ET2, such that a current Ied flows through the light-emitting element ED. Accordingly, the light-emitting element ED may output a light corresponding to the current Ied.

In such an embodiment, an operation in the second write frame WF2 is similar to the operation in the first write frame WF1. Thus, any repetitive detailed description associated with the second write frame WF2 will be omitted to avoid redundancy.

In an embodiment, referring to FIGS. 2 and 3, in the second driving mode, the first and fourth scan signals SS1_Ai and SS4_Ai are maintained in an inactive state during the first and second holding frames HF1 and HF2. During the first and second holding frames HF1 and HF2, the second, third, and fifth scan signals SS2_Bi, SS3_Bi−1, and SS5_Bi may be activated within the inactive period NAP of the light-emitting control signal EMi.

When the third scan signal SS3_Bi−1 of the low level is provided to the pixel PXij in the first period P1, the fourth transistor T4 is turned on in response to the third scan signal SS3_Bi−1. The initialization voltage VINT is transferred to the first node N1 through the fourth transistor T4 turned on, and the first node N1 is initialized by the initialization voltage VINT.

Next, in the second and third periods P2 and P3, the third transistor T3 is turned on by the second scan signal SS2_Bi of the low level. The initialization voltage VINT is applied to the second electrode of the first transistor T1 through the third transistor T3 turned on. A potential of the second electrode of the first transistor T1 may increase during a light-emitting period of each of the first and second write frames WF1 and WF2. When the first and second light-emitting control transistors ET1 and ET2 are turned on, with the potential of the second electrode of the first transistor T1 increased, the luminance of the light-emitting element ED may decrease. In an embodiment of the disclosure, the third and fourth transistors T3 and T4 may be turned on during the holding frame HF1/HF2 interposed between two adjacent write frames in the second driving mode such that the initialization voltage VINT is applied to the second electrode of the first transistor T1. Accordingly, a potential of the second electrode of the first transistor T1 may also decrease to the initialization voltage VINT in the respective holding frames HF1 and HF2, and thus, the issue that luminance of the light-emitting element ED decreases in the respective holding frames HF1 and HF2 may be improved.

In such an embodiment, during the first and second holding frames HF1 and HF2 of the second driving mode, the sixth transistor T6 may drain a part of the minimum current of the first transistor T1 to a current path, which is different from a current path to the light-emitting element ED, as the bypass current Ibp. Accordingly, in the respective holding frames HF1 and HF2, a contrast ratio may also be improved by implementing an accurate black luminance image by using the sixth transistor T6.

Figure 5:
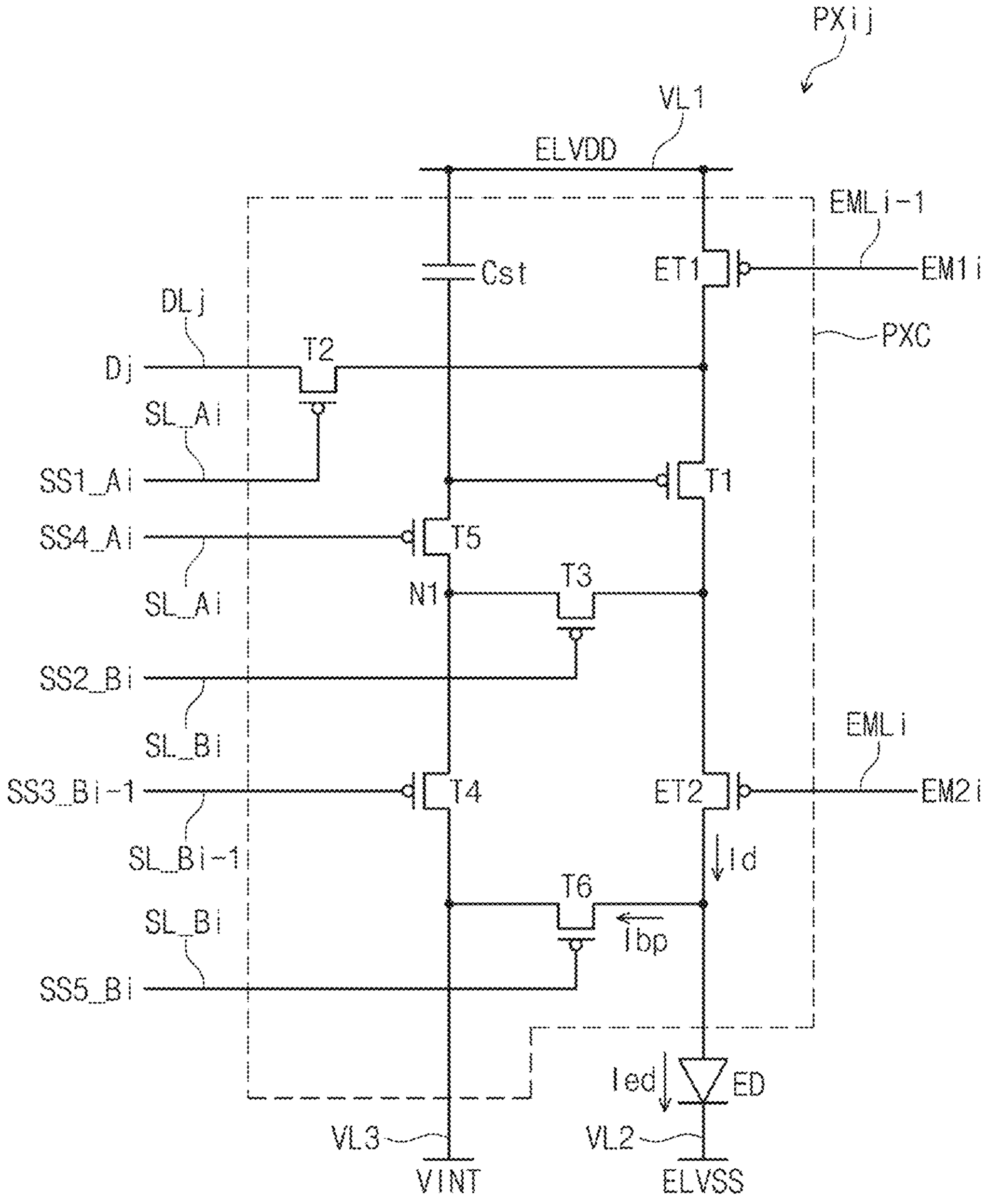
FIG. 5 is a circuit diagram of a pixel according to an embodiment of the disclosure.
Figure 6:
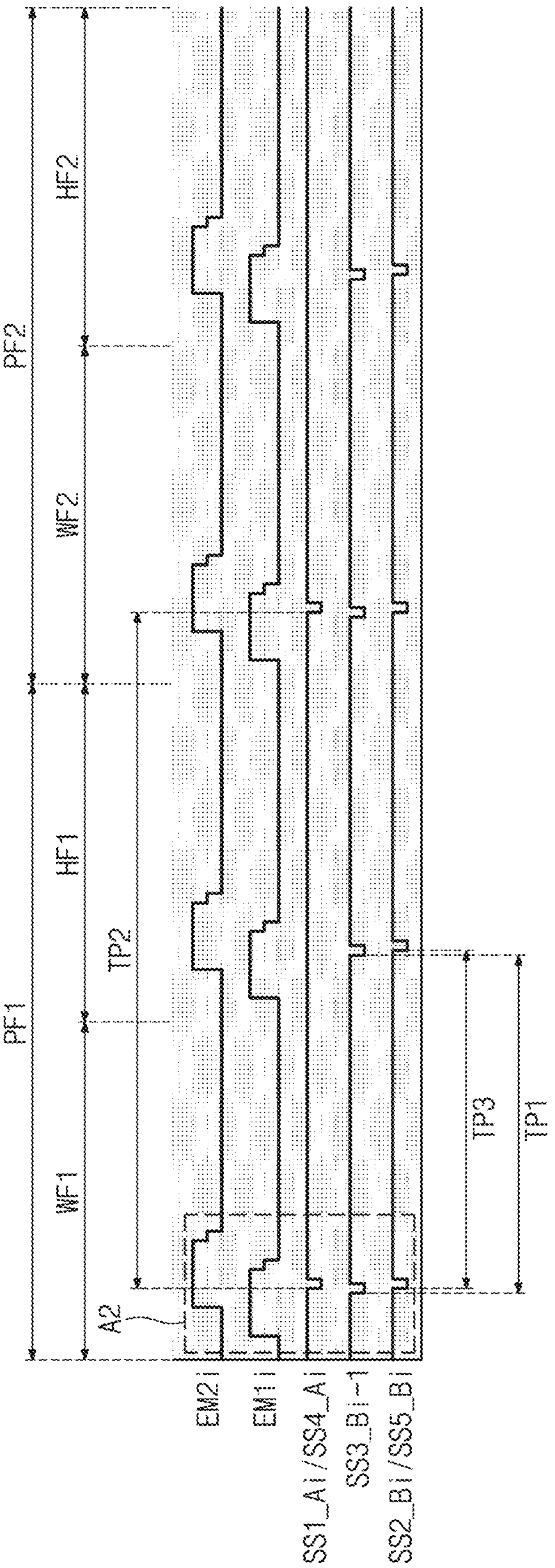
FIG. 6 is a signal timing diagram for describing an operation of a pixel of FIG. 5.
Figure 7:
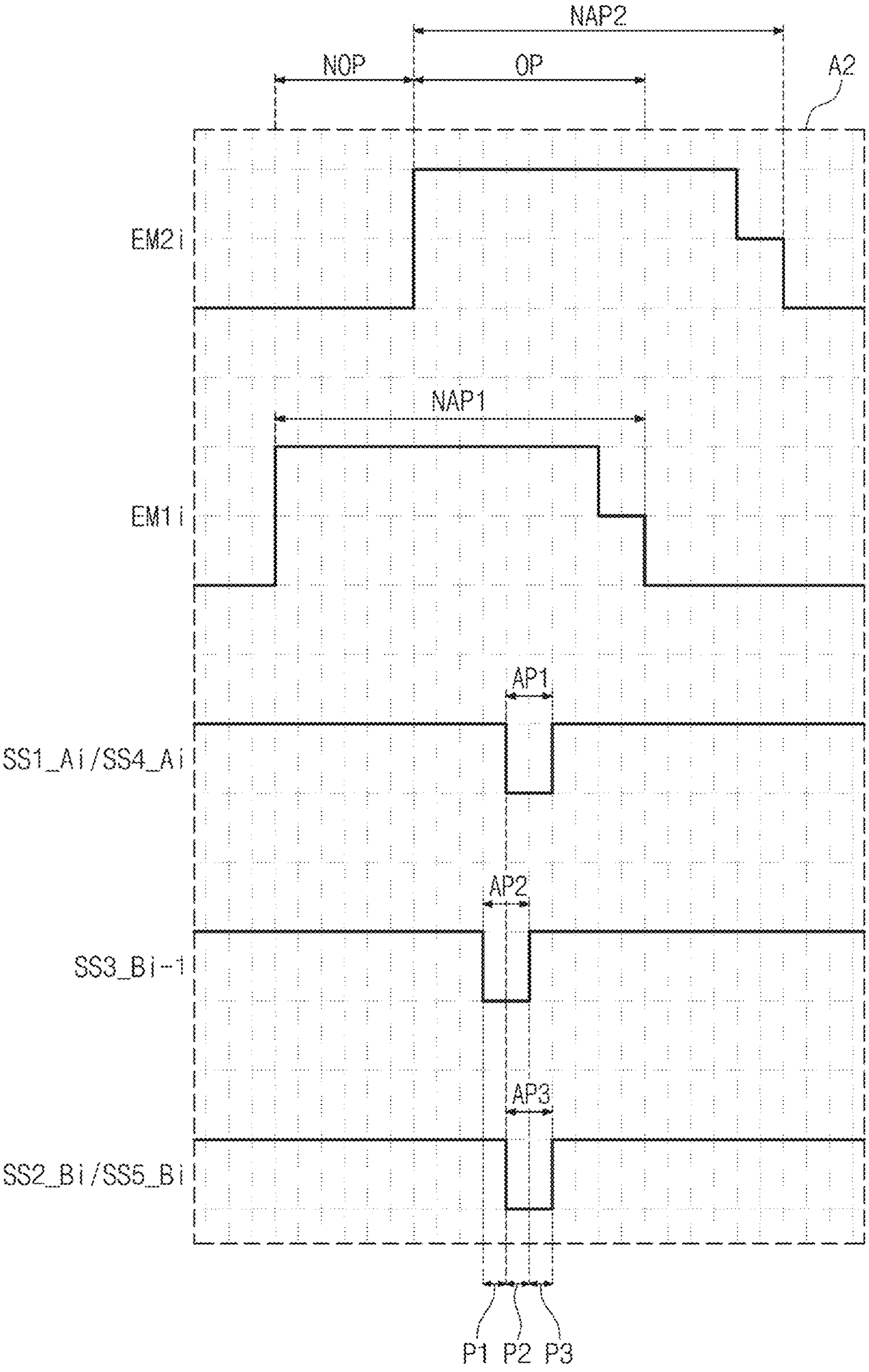
FIG. 7 is an enlarged view of portion A2 illustrated in FIG. 6.

FIG. 5 is a circuit diagram of a pixel according to an embodiment of the disclosure. FIG. 6 is a signal timing diagram for describing an operation of a pixel of FIG. 5, and FIG. 7 is an enlarged view portion A2 illustrated in FIG. 6. The same or like elements shown in FIG. 5 have been labeled with the same reference characters as used above to describe the embodiment of the pixel shown in FIG. 2, and any repetitive detailed description thereof will be omitted to avoid redundancy.

Referring to FIGS. 5 to 7, an embodiment of the pixel PXij includes the light-emitting element ED and the pixel circuit unit PXC. The pixel circuit unit PXC includes the first to sixth transistors T1, T2, T3, T4, T5, and T6, the first and second light-emitting control transistors ET1 and ET2, and the capacitor Cst. Each of the first to sixth transistors T1, T2, T3, T4, T5, and T6 and the first and second light-emitting control transistors ET1 and ET2 may be a transistor having a LTPS semiconductor layer. In an embodiment, each of the first to sixth transistors T1 to T6 may be a P-type transistor, and each of the first and second light-emitting control transistors ET1 and ET2 may also be a P-type transistor.

The first to sixth transistors T1 to T6 illustrated in FIG. 5 have a same connection structure as the first to sixth transistors T1 to T6 illustrated in FIG. 2. Thus, any repetitive detailed description associated with the first to sixth transistors T1 to T6 will be omitted to avoid redundancy.

The first light-emitting control transistor ET1 includes a first electrode connected with the first voltage line VL1, a second electrode connected with the first electrode of the first transistor T1, and a third electrode connected with a first light-emitting control signal EM1*i*.

The second light-emitting control transistor ET2 includes a first electrode connected with the second electrode of the first transistor T1, a second electrode connected with the anode of the light-emitting element ED, and a third electrode connected with a second light-emitting control signal EM2*i*.

The first light-emitting control transistor ET1 is connected with an (i−1)-th light-emitting control line EMLi−1 (hereinafter referred to as a "previous light-emitting control line"). Accordingly, the first light-emitting control transistor ET1 may receive an (i−1)-th light-emitting control signal transferred through the previous light-emitting control line EMLi-1 as the first light-emitting control signal EM1*i*. The second light-emitting control transistor ET2 is connected with an i-th light-emitting control line EMLi (hereinafter referred to as a "current light-emitting control line"). Accordingly, the second light-emitting control transistor ET2 may receive an i-th light-emitting control signal transferred through the current light-emitting control line EMLi as the second light-emitting control signal EM2*i*.

In an embodiment, as shown in FIG. 6, the first light-emitting control signal EM1*i* may be deactivated prior to the second light-emitting control signal EM2*i*. In an embodiment, as shown in FIG. 7, where an inactive period of the first light-emitting control signal EM1*i* is defined as a first inactive period NAP1 and an inactive period of the second light-emitting control signal EM2*i* is defined as a second inactive period NAP2, the first inactive period NAP1 precedes the second inactive period NAP2. The first and second inactive periods NAP1 and NAP2 may partially overlap each other.

A part of the first inactive period NAP1, which does not overlap the second inactive period NAP2, may be defined as a non-overlapping period NOP, and a part of the first inactive period NAP1, which overlaps the second inactive period NAP2, may be defined as an overlapping period OP.

Referring to FIGS. 5 and 7, during the non-overlapping period NOP, the first light-emitting control signal EM1*i* is deactivated, and the second light-emitting control signal EM2*i* is maintained in an active state. During the non-overlapping period NOP, all the first to fifth scan signals SS1_Ai, SS2_Bi, SS3_Bi−1, SS4_Ai, and SS5_Bi are maintained in an inactive state. During the non-overlapping period NOP, when the first light-emitting control transistor ET1 is turned off by the first light-emitting control signal EM1*i*, a potential of the first electrode of the first transistor T1 is maintained at the first driving voltage ELVDD.

The threshold voltage (Vth) of the first transistor T1 may also change based on a gate-source voltage of the first transistor T1. The dependency of the threshold voltage (Vth) on the gate-source voltage may be referred to as a hysteresis of a transistor.

According to the hysteresis characteristic of the first transistor T1, a driving current of the first transistor T1 may be affected by the data signal Dj applied in a previous write frame. In detail, in a case where the data signal Dj for displaying an image of a specific gray scale is provided in a current write frame and the data signal Dj for displaying an image of a low gray scale is provided in a previous write frame, an image of a gray scale higher than the specific gray scale of the current write frame may be displayed by the light-emitting element ED. Also, in a case where the data signal Dj for displaying an image of a specific gray scale is provided in a current write frame and the data signal Dj for displaying an image of a high gray scale is provided in a previous write frame, an image of a gray scale lower than the specific gray scale of the current write frame may be displayed by the light-emitting element ED.

In a case where a change period of the data signal Dj is fast, that is, when a driving frequency of the display device DD is high, such an issue may not be perceived by a user. However, as the driving frequency of the display device DD decreases, the change period of the data signal Dj may become longer. Accordingly, a change in luminance due to the hysteresis characteristic of the first transistor T1 may be perceived by the user.

During the non-overlapping period NOP, as the first light-emitting control signal EM1*i* is first deactivated, a potential of the first electrode of the first transistor T1 may be maintained at the first driving voltage ELVDD, and thus, a change in luminance due to the hysteresis characteristic may be minimized.

In an embodiment, during the first write frame WF1, the first to fifth scan signals SS1_Ai, SS2_Bi, SS3_Bi−1, SS4_Ai, and SS5_Bi may be activated within the overlapping period OP. In an embodiment, an active period of the first and fourth scan signals SS1_Ai and SS4_Ai may be defined as a first active period AP1, an active period of the third scan signal SS3_Bi−1 may be defined as a second active period AP2, and an active period of the second and fifth scan signals SS2_Bi and SS5_Bi may be defined as a third active period AP3. In such an embodiment, each of the first to third active periods AP1 to AP3 may overlap the overlapping period OP.

The second active period AP2 may precede the first and third active periods AP1 and AP3, and the second active period AP2 and the first and third active periods AP1 and AP3 may partially overlap each other. A part of the second active period AP2, which does not overlap the first and third active periods AP1 and AP3, may be defined as a first period P1, a part of the second active period AP2, which overlaps the first and third active periods AP1 and AP3, may be defined as a second period P2, and a part of the first and third active periods AP1 and AP3, which does not overlap the second active period AP2, may be defined as a third period P3. In such an embodiment, during the first period P1, the third scan signal SS3_Bi−1 is activated, and the first, second, fourth, and fifth scan signals SS1_Ai, SS2_Bi, SS4_Ai, and SS5_Bi are deactivated. The first to fifth scan signals SS1_Ai, SS2_Bi, SS3_Bi−1, SS4_Ai, and SS5_Bi are activated during the second period P2. Also, during the third period P3, the first, second, fourth, and fifth scan signals SS1_Ai, SS2_Bi, SS4_Ai, and SS5_Bi are activated, and the third scan signal SS3_Bi−1 is deactivated.

During the first write frame WF1, an operation of the pixel PXij in the overlapping period OP is similar to the operation of the pixel PXij in the inactive period NAP of the light-emitting control signal EMi illustrated in FIG. 5, and thus, any repetitive detailed description thereof will be omitted to avoid redundancy.

Figure 8:
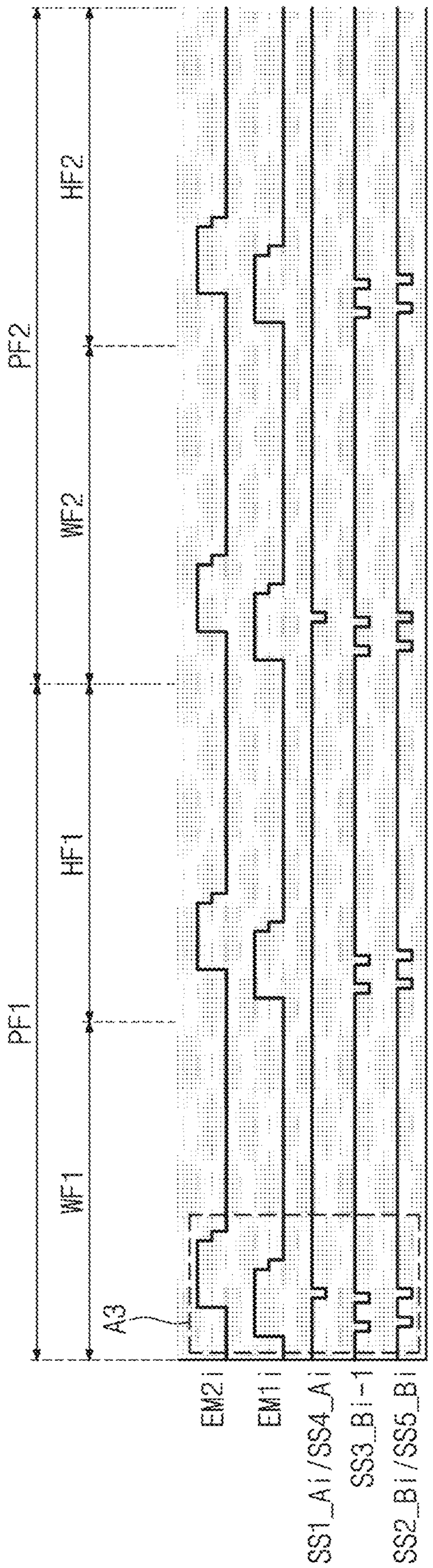
FIG. 8 is a signal timing diagram for describing an operation of a pixel of FIG. 5.
Figure 9:
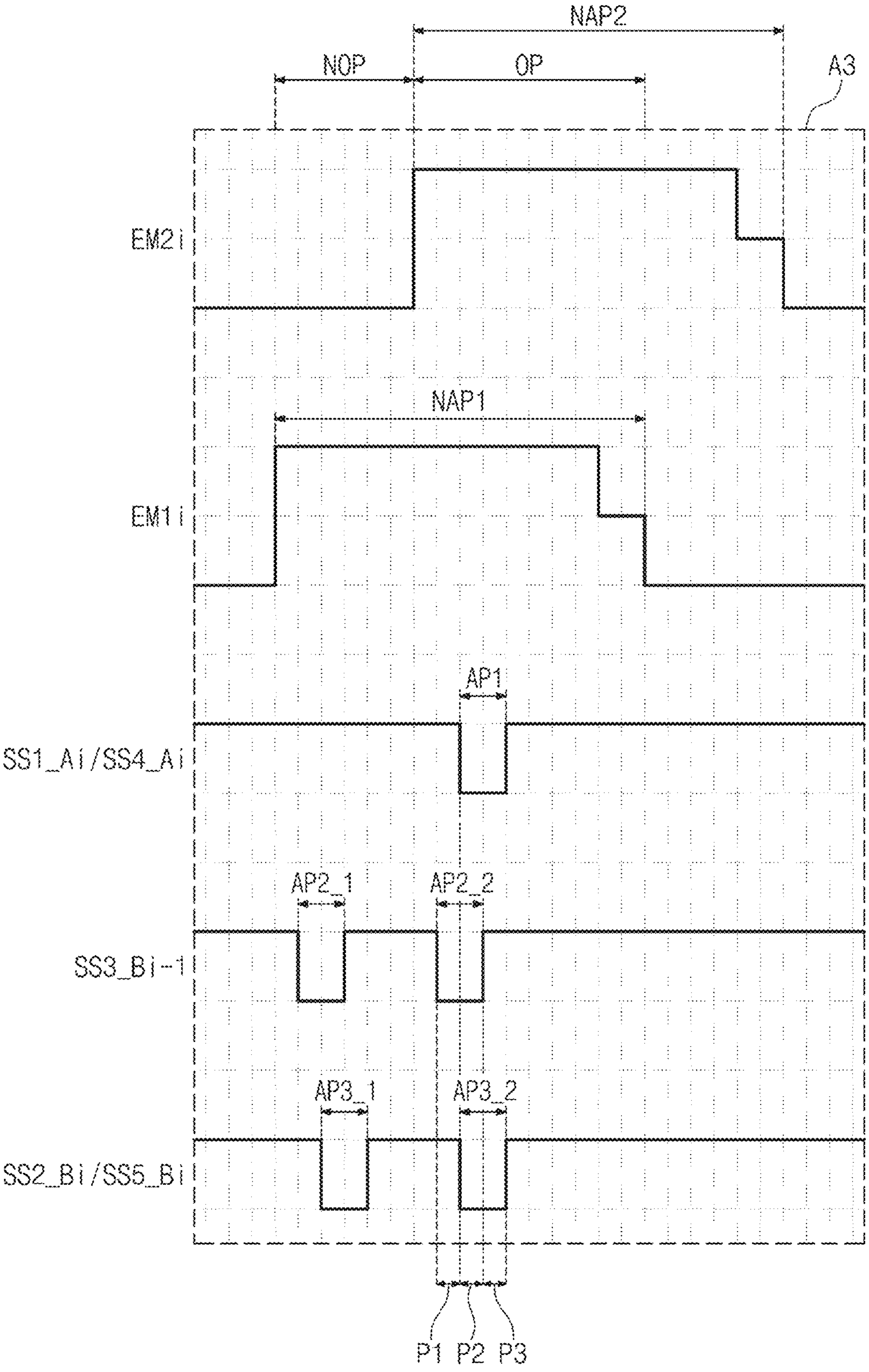
FIG. 9 is an enlarged view of portion A3 illustrated in FIG. 8.

FIG. 8 is a signal timing diagram for describing an operation of a pixel of FIG. 5, and FIG. 9 is an enlarged view of portion A3 illustrated in FIG. 8. The same or like elements shown in FIGS. 8 and 9 have been labeled with the same reference characters as used above to describe the embodiment of the operation of the pixel shown in FIGS. 6 and 7, and any repetitive detailed description thereof will be omitted to avoid redundancy.

Referring to FIGS. 8 and 9, the first light-emitting control signal EM1*i* may be deactivated prior to the second light-emitting control signal EM2*i*. When an inactive period of the first light-emitting control signal EM1*i* is defined as a first inactive period NAP1 and an inactive period of the second light-emitting control signal EM2*i* is defined as a second inactive period NAP2, the first inactive period NAP1 precedes the second inactive period NAP2. The first and second inactive periods NAP1 and NAP2 may partially overlap each other.

In such an embodiment, as shown in FIG. 9, a part of the first inactive period NAP1, which does not overlap the second inactive period NAP2, may be defined as a non-overlapping period NOP, and a part of the first inactive period NAP1, which overlaps the second inactive period NAP2, may be defined as an overlapping period OP.

Referring to FIG. 9, during the first write frame WF1, the second, third, and fifth scan signals SS2_Bi, SS3_Bi−1, and SS5_Bi may be activated within the non-overlapping period NOP, and the first to fifth scan signals SS1_Ai, SS2_Bi, SS3_Bi−1, SS4_Ai, and SS5_Bi may be activated within the overlapping period OP.

Each of the first and fourth scan signals SS1_Ai and SS4_Ai includes a first active period AP1 that is activated within the overlapping period OP. The third scan signal SS3_Bi−1 includes a first sub-active period AP2_1 that is activated within the non-overlapping period NOP and a second sub-active period AP2_2 that is activated within the overlapping period OP. Each of the second and fifth scan signals SS2_Bi and SS5_Bi includes a third sub-active period AP3_1 that is activated within the non-overlapping period NOP and a fourth sub-active period AP3_2 that is activated within the overlapping period OP.

The first sub-active period AP2_1 precedes the second sub-active period AP2_2, and the third sub-active period AP3_1 precedes the fourth sub-active period AP3_2. The first sub-active period AP2_1 precedes the third sub-active period AP3_1 and overlaps the third sub-active period AP3_1. The second sub-active period AP2_2 precedes the fourth sub-active period AP3_2 and overlaps the fourth sub-active period AP3_2. The second sub-active period AP2_2 and the fourth sub-active period AP3_2 overlap the first active period AP1. In one embodiment, for example, the fourth sub-active period AP3_2 may fully overlap the first active period AP1.

In an embodiment, a part of the second sub-active period AP2_2, which does not overlap the first active period AP1 and the fourth sub-active period AP3_2, is defined as a first period P1, and a part of the second sub-active period AP2_2, which overlaps the first active period AP1 and the fourth sub-active period AP3_2, is defined as a second period P2. In such an embodiment, a part of the first active period AP1, which does not overlap the second sub-active period AP2_2, is defined as a third period P3. In such an embodiment, during the first period P1, the third scan signal SS3_Bi−1 is activated, and the first, second, fourth, and fifth scan signals SS1_Ai, SS2_Bi, SS4_Ai, and SS5_Bi are deactivated. The first to fifth scan signals SS1_Ai, SS2_Bi, SS3_Bi−1, SS4_Ai, and SS5_Bi are activated during the second period P2. In such an embodiment, during the third period P3, the first, second, fourth, and fifth scan signals SS1_Ai, SS2_Bi, SS4_Ai, and SS5_Bi are activated, and the third scan signal SS3_Bi−1 is deactivated.

During the non-overlapping period NOP, the first light-emitting control signal EM1*i* is deactivated, and the second light-emitting control signal EM2*i* is maintained in the active state. During the non-overlapping period NOP, the first and fourth scan signals SS1_Ai and SS4_Ai are maintained in the inactive state. In the non-overlapping period NOP, the third scan signal SS3_Bi−1 may be activated during the first sub-active period AP2_1, and the second and fifth scan signals SS2_Bi and SS5_Bi may be activated during the third sub-active period AP3_1.

During the first sub-active period AP2_1, the third scan signal SS3_Bi−1 of the low level is provided to the pixel PXij, and the fourth transistor T4 is turned on in response to the third scan signal SS3_Bi−1. The initialization voltage VINT is transferred to the first node N1 through the fourth transistor T4 turned on, and the first node N1 is initialized by the initialization voltage VINT.

In such an embodiment, during the third sub-active period AP3_1, the third transistor T3 is turned on by the second scan signal SS2_Bi of the low level. The initialization voltage VINT is applied to the second electrode of the first transistor T1 through the third transistor T3 turned on. Accordingly, a potential of the second electrode of the first transistor T1 may decrease to the initialization voltage VINT before the second light-emitting control signal EM2*i* is deactivated. As a result, the issue that the luminance of the light-emitting element ED decreases in the first write frame WF1 may be improved.

In such an embodiment, during the third sub-active period AP3_1 of the second driving mode, the sixth transistor T6 may drain (or disperse) a part of the minimum current of the first transistor T1 to a current path, which is different from a current path to the light-emitting element ED, as the bypass current Ibp. Accordingly, in the first write frame WF1, a contrast ratio may also be improved by implementing an accurate black luminance image by using the sixth transistor T6.

Figure 10A:
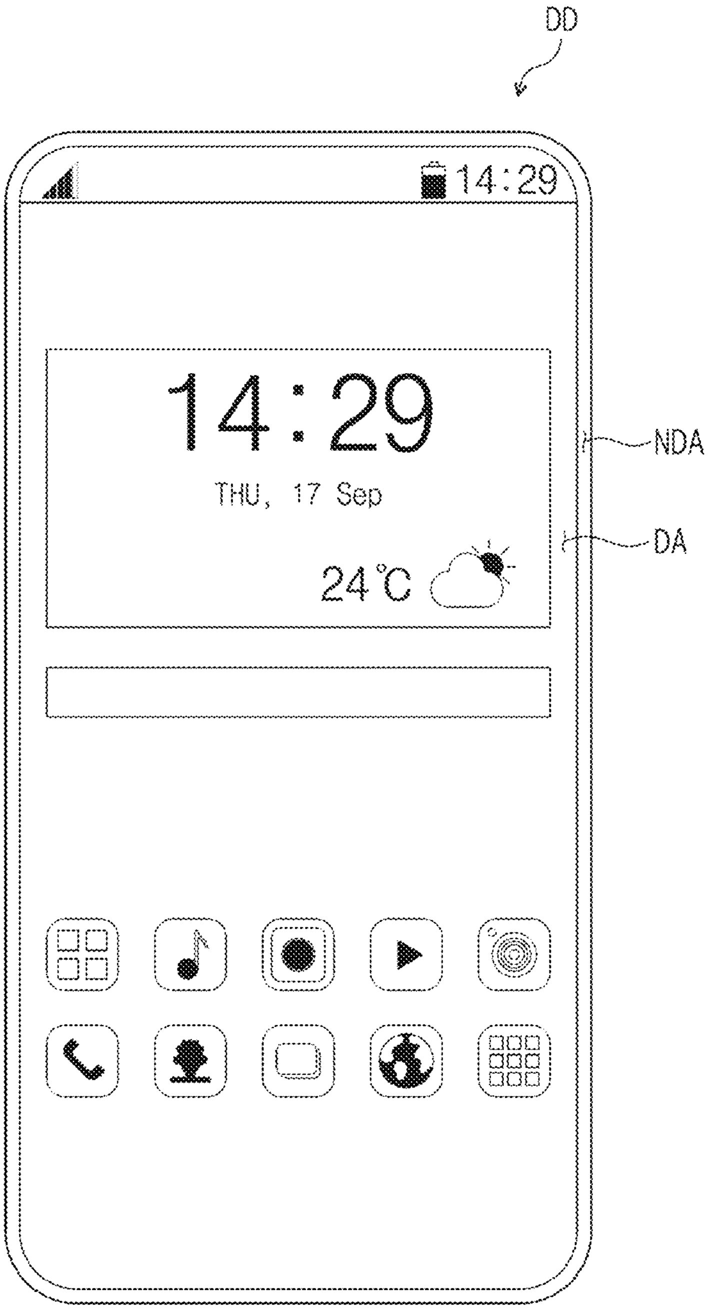
FIG. 10A is a plan view illustrating a screen of a display device operating in a normal-frequency mode.
Figure 10B:
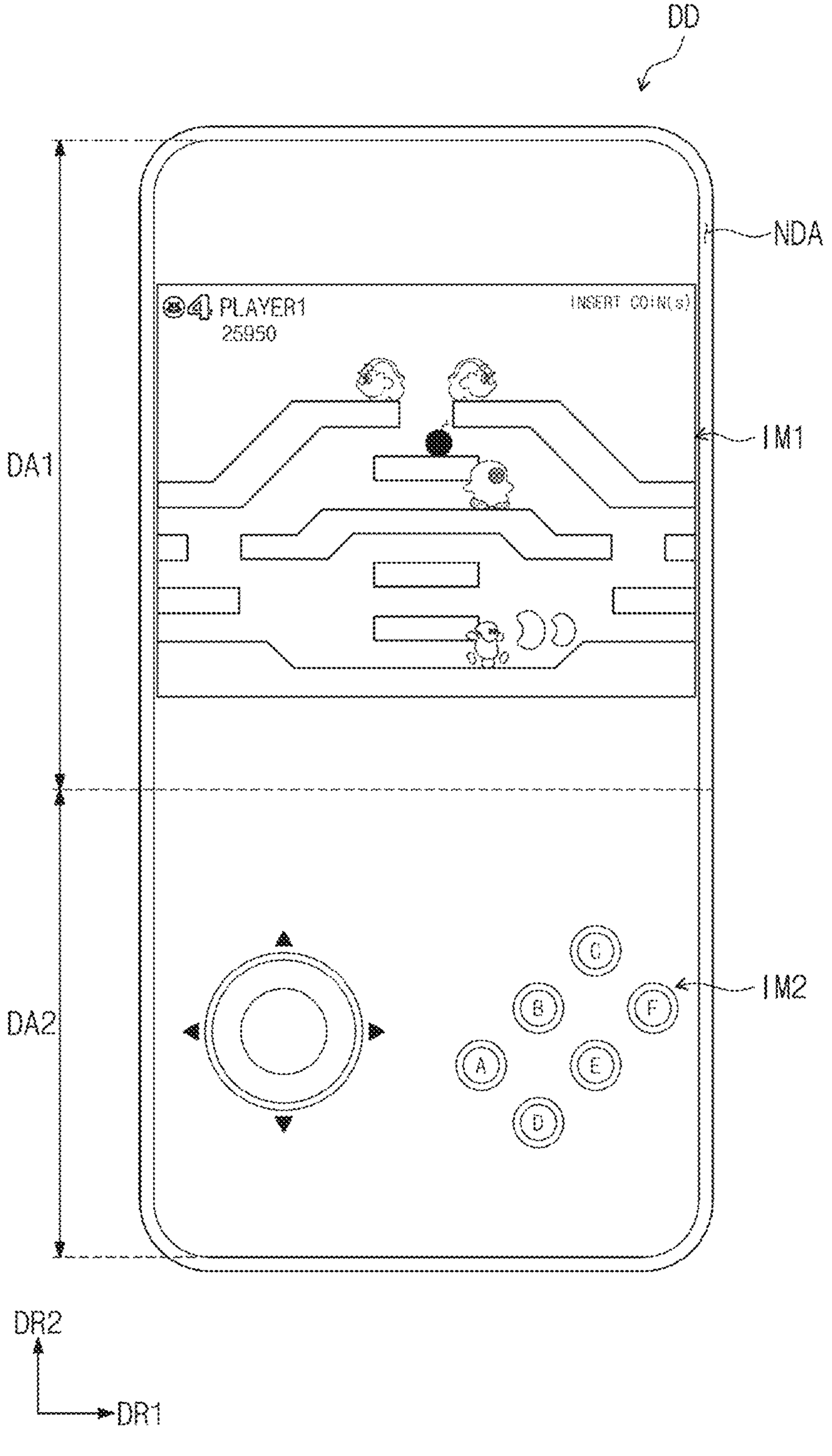
FIG. 10B is a plan view illustrating a screen of a display device operating in a multi-frequency mode.
Figure 11A:
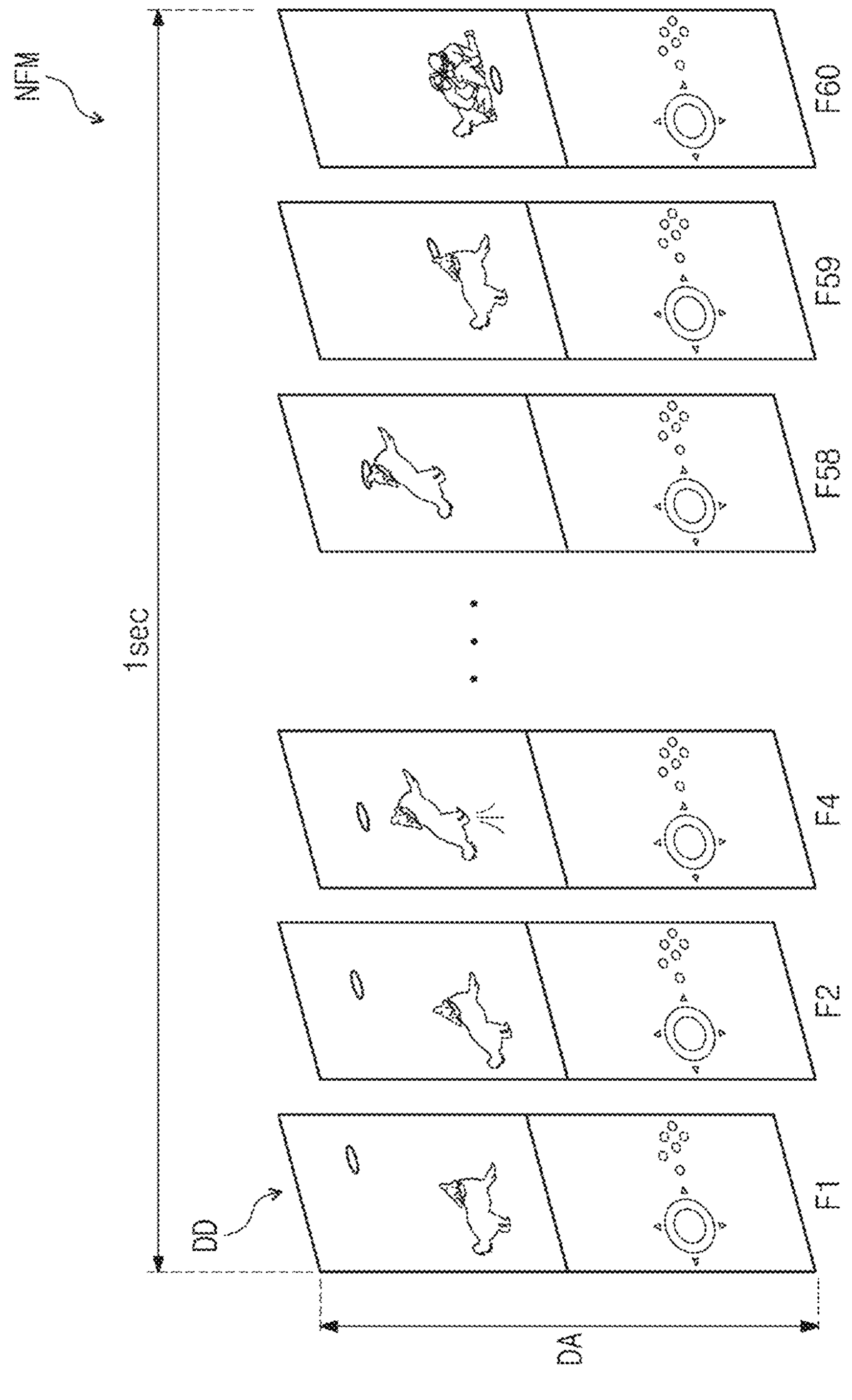
FIG. 11A is a view for describing an operation of a display device in a normal-frequency mode.
Figure 11B:
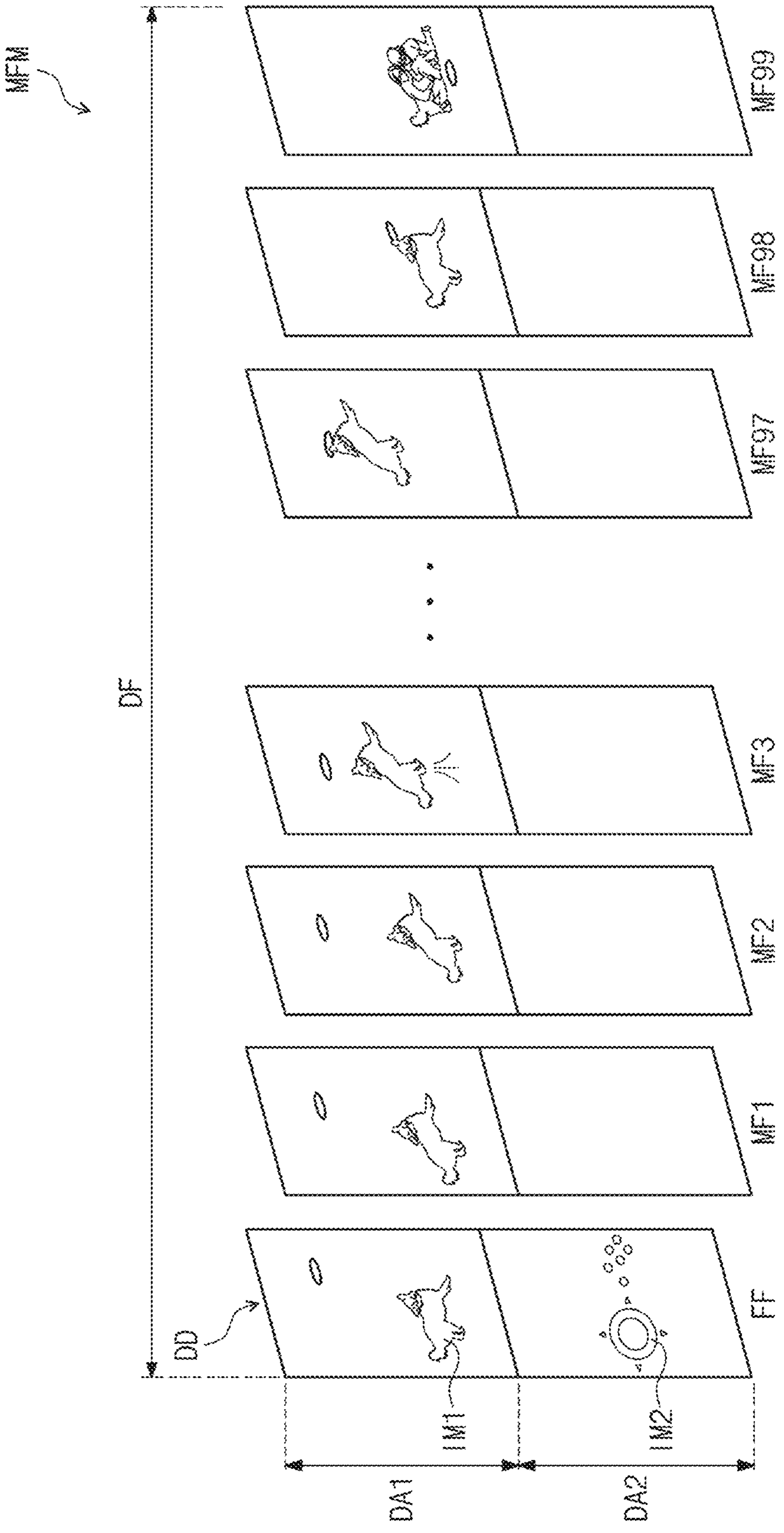
FIG. 11B is a view for describing an operation of a display device in a multi-frequency mode.

FIG. 10A is a plan view illustrating a screen of a display device operating in a normal-frequency mode, and FIG. 10B is a plan view illustrating a screen of a display device operating in a multi-frequency mode. FIG. 11A is a view for describing an operation of a display device in a normal-frequency mode, and FIG. 11B is a view for describing an operation of a display device in a multi-frequency mode.

Referring to FIGS. 10A to 11B, an embodiment of the display device DD may display an image in a normal-frequency mode NFM or a multi-frequency mode MFM. In the normal-frequency mode NFM, the display area DA of the display device DD is not divided into a plurality of display areas in which driving frequencies are different from each other. That is, in the normal-frequency mode NFM, the display area DA may operate at one driving frequency, and the driving frequency of the display area DA in the normal-frequency mode NFM may be defined as a normal frequency. In one embodiment, for example, the normal frequency may be about 60 Hz. In the normal-frequency mode NFM, 60 images including a 1st frame F1 to a 60th frame F60 may be displayed in the display area DA of the display device DD for 1 second (1 sec).

In the multi-frequency mode MFM, the display area DA of the display device DD is divided into a plurality of display areas in which driving frequencies are different. In one embodiment, for example, in the multi-frequency mode MFM, the display area DA may include a first display area DA1 and a second display area DA2. The first and second display areas DA1 and DA2 may be disposed adjacent to each other on the second direction DR2. The driving frequency (hereinafter referred to as a “first driving frequency”) of the first display area DA1 may be higher than or equal to the normal frequency, and the driving frequency (hereinafter referred to as a “second driving frequency”) of the second display area DA2 may be lower than the normal frequency. In one embodiment, for example, where the normal frequency is about 60 Hz, the first driving frequency may be about 60 Hz, about 80 Hz, about 90 Hz, about 100 Hz, about 120 Hz, etc., and the second driving frequency may be about 1 Hz, about 20 Hz, about 30 Hz, about 40 Hz, etc.

In one embodiment, for example, the first display area DA1 may be an area where a video (hereinafter referred to as a “first image IM1”) desired to be driven with high-speed driving, and the second display area DA2 may be an area where a still image which may not be driven with high-speed driving or a text image (hereinafter referred to as a “second image IM2”) having a long change period is displayed. Accordingly, when the still image and the video are simultaneously displayed in the screen of the display device DD, by operating the display device DD in the multi-frequency mode MFM, the display quality of the video may be improved, and overall power consumption may be reduced.

Referring to FIGS. 10B and 11B, in the multi-frequency mode MFM, an image may be displayed in the first and second display areas DA1 and DA2 of the display device DD during a plurality of driving frames DF. Each of the driving frames DF may include a full frame FF in which the first display area DA1 and the second display area DA2 are driven, and masking frames MF1 to MF99 in which only the first display area DA1 is driven. Each of the masking frames MF1 to MF99 may have a duration (or time duration) shorter than the full frame FF. The numbers of masking frames MF1 to MF99 included in the driving frames DF may be equal or different. Each driving frame DF may be defined as a period from a time at which a current full frame FF is initiated to a time at which a next full frame FF is initiated.

In one embodiment, for example, during each driving frame DF, the first display area DA1 may operate at about 100 Hz, and the second display area DA2 may operate at about 1 Hz. In this case, each driving frame DF may have a duration corresponding to 1 second (1 sec) and may include one full frame FF and 99 masking frames MF1 to MF99. In each driving frame DF, the first images IM1 including the full frame FF and the 99 masking frames MF1 to MF99, that is, 100 images IM1, may be displayed in the first display area DA1 of the display device DD, and one second image IM2 corresponding to the full frame FF may be displayed in the second display area DA2.

For convenience of description, an embodiment where in the multi-frequency mode MFM, the first driving frequency is about 100 Hz and the second driving frequency is about 1 Hz is illustrated in FIG. 11B, but the disclosure is not limited thereto. In one embodiment, for example, the first driving frequency may be about 100 Hz, and the second driving frequency may be about 20 Hz. In such an embodiment, in each driving frame DF, the first images IM1 including one full frame FF and 4 masking frames, that is, 5 images IM1, may be displayed in the first display area DA1 of the display device DD, and one second image IM2 corresponding to the full frame FF may be displayed in the second display area DA2. Alternatively, the first driving frequency may be about 90 Hz, and the second driving frequency may be about 30 Hz. In such an embodiment, in each driving frame DF, the first images IM1 including one full frame FF and 2 masking frames, that is, 3 images IM1, may be displayed in the first display area DA1 of the display device DD, and one second image IM2 corresponding to the full frame FF may be displayed in the second display area DA2.

Figure 12:
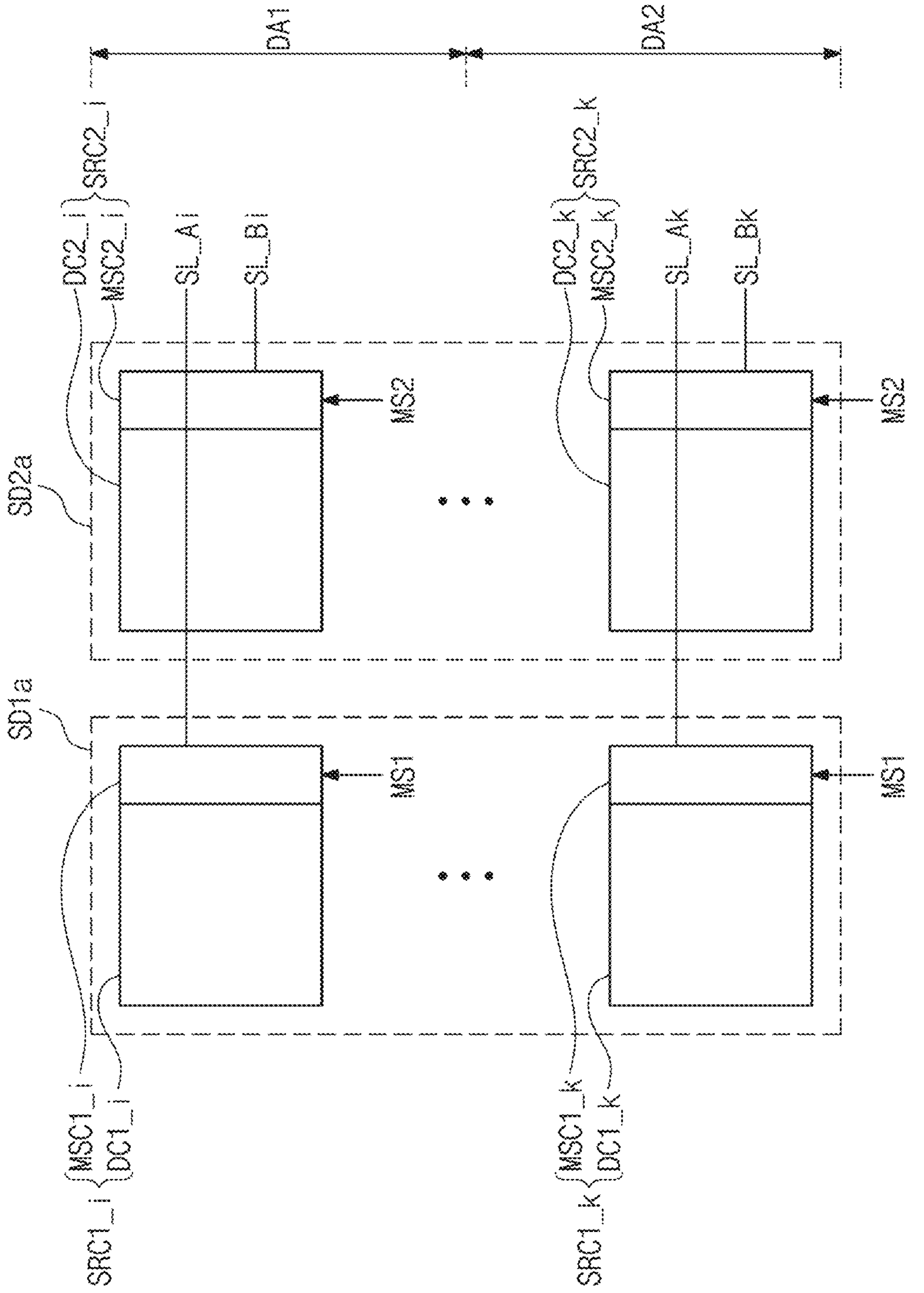
FIG. 12 is a block diagram illustrating a configuration of first and second scan drivers according to an embodiment of the disclosure.
Figure 13:
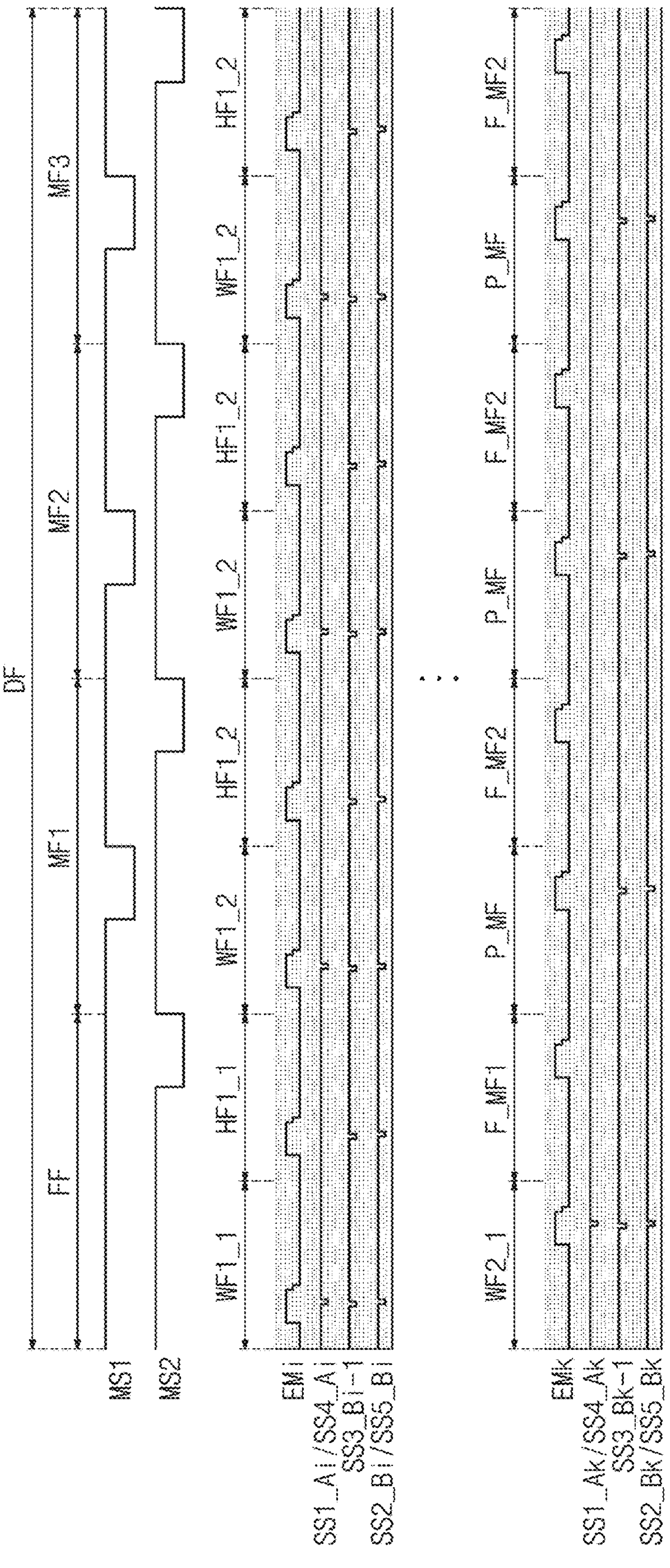
FIG. 13 is a signal timing diagram for describing operations of first and second scan drivers illustrated in FIG. 12.

FIG. 12 is a block diagram illustrating a configuration of first and second scan drivers according to an embodiment of the disclosure, and FIG. 13 is a signal timing diagram for describing operations of first and second scan drivers illustrated in FIG. 12.

Referring to FIG. 12, in an embodiment, a first scan driver SD1*a* operates at a first frequency, and a second scan driver SD2*a* operates at a second frequency higher than the first frequency. In the normal-frequency mode NFM (refer to FIGS. 10A and 11A), the first frequency may be equal to the normal frequency, and the second frequency may be higher than or equal to the normal frequency. In one embodiment, for example, where the normal frequency is about 60 Hz, the first frequency may be about 60 Hz, and the second frequency may be about 60 Hz or about 120 Hz.

In the multi-frequency mode MFM (refer to FIGS. 10B and 11B), the first frequency may be equal to the first driving frequency, and the second frequency may be higher than or equal to the first driving frequency. The second driving frequency may be lower than the first frequency. In one embodiment, for example, where the first driving frequency is about 60 Hz and the second driving frequency about 30 Hz, the first frequency may be about 60 Hz, and the second frequency may be about 120 Hz.

The first scan driver SD1*a* includes a plurality of low-frequency driving stages SRC1_*i* to SRC1_*k*. Each of the low-frequency driving stages SRC1_*i* to SRC1_*k* may output a low-frequency scan signal to the corresponding low-frequency scan line. Each of the low-frequency driving stages SRC1_*i* to SRC1_*k* receives the first scan control signal SCS1 from the driver controller 100 illustrated in FIG. 1. In one embodiment, for example, the first scan control signal SCS1 includes a start signal, a plurality of clock signals, and a first masking signal MS1. The first masking signal MS1 may be a signal for masking low-frequency scan signals to be supplied to the second display area DA2 to a given level. In one embodiment, for example, the first masking signal MS1 may be provided to each of the low-frequency driving stages SRC1_*i* to SRC1_*k*.

Each of the low-frequency driving stages SRC1_*i* to SRC1_*k* includes a low-frequency driving circuit (DC1_*i* . . . DC1_*k*) that generates a low-frequency scan signal and a low-frequency masking circuit (MSC1_*i* . . . MSC1_*k*) connected with the low-frequency driving circuit (DC1_*i* . . . DC1_*k*). An i-th low-frequency driving stage SRC1_*i* of the low-frequency driving stages SRC1_*i* to SRC1_*k* is connected with an i-th low-frequency scan line SL_Ai, and a k-th low-frequency driving stage SRC1_*k* thereof is connected with a k-th low-frequency scan line SL_Ak.

Each of the low-frequency driving circuits DC1_*i* to DC1_*k* may operate at the first frequency and may output a low-frequency scan signal. Each of the low-frequency masking circuits MSC1_*i* to MSC1_*k* selectively masks a low-frequency scan signal to a given level in response to the first masking signal MS1. In such an embodiment, during an active period of the first masking signal MS1, a low-frequency scan signal may be maintained at the high level, that is, may be deactivated.

The second scan driver SD2*a* includes a plurality of high-frequency driving stages SRC2_*i* to SRC2_*k*. Each of the high-frequency driving stages SRC2_*i* to SRC2_*k* may output a high-frequency scan signal to the corresponding high-frequency scan line. Each of the high-frequency driving stages SRC2_*i* to SRC2_*k* receives the second scan control signal SCS2 from the driver controller 100 illustrated in FIG. 1. In one embodiment, for example, the second scan control signal SCS2 includes a start signal, a plurality of clock signals, and a second masking signal MS2. The second masking signal MS2 may be a signal for masking high-frequency scan signals to be supplied to the second display area DA2 to a given level. In one embodiment, for example, the second masking signal MS2 may be provided to each of the high-frequency driving stages SRC2_*i* to SRC2_*k*.

Each of the high-frequency driving stages SRC2_*i* to SRC2_*k* includes a high-frequency driving circuit DC2_*i* to DC2_*k* that generates a high-frequency scan signal and a high-frequency masking circuit MSC2_*i* to MSC2_*k* connected with the high-frequency driving circuit DC2_*i* to DC2_*k*. An i-th low-frequency driving stage SRC2_*i* of the high-frequency driving stages SRC2_*i* to SRC2_*k* is connected with an i-th high-frequency scan line SL_Bi, and a k-th high-frequency driving stage SRC2_*k* thereof is connected with a k-th high-frequency scan line SL_Bk.

Each of the high-frequency driving circuits DC2_*i* to DC2_*k* may operate at the second frequency and may output a high-frequency scan signal. Each of the high-frequency masking circuits MSC2_*i* to MSC2_*k* selectively masks a high-frequency scan signal to a given level in response to the second masking signal MS2. In such an embodiment, during an active period of the second masking signal MS2, a high-frequency scan signal may be maintained at the high level, that is, may be deactivated.

Referring to FIGS. 2, 10B, and 13, in the multi-frequency mode MFM, the driving frame DF of the display device DD includes one full frame FF and 3 masking frames MF1, MF2, and MF3. The number of the masking frames MF1, MF2, and MF3 included in the driving frame DF may be variable based on the first and second driving frequencies. In one embodiment, for example, the first driving frequency may be about 60 Hz, and the second driving frequency may be about 15 Hz. The first scan driver SD1*a* may operate at a first frequency, and the second scan driver SD2*a* may operate at a second frequency. In one embodiment, for example, the first frequency may be about 60 Hz, and the second frequency may be about 120 Hz.

The full frame FF associated with the first display area DA1 may include a first write frame WF1_1 and a first holding frame HF1_1. Each of the masking frames MF1 to MF3 associated with the first display area DA1 may include a second write frame WF1_2 and a second holding frame HF1_2.

The first and second scan drivers SD1*a* and SD2*a* are activated during the first and second write frames WF1_1 and WF1_2. Accordingly, each of the first to fifth scan signals SS1_Ai, SS2_Bi, SS3_Bi−1, SS4_Ai, and SS5_Bi that are supplied to a pixel disposed in the first display area DA1 may be activated. During the first and second holding frames HF1_1 and HF1_2, the first scan driver SD1*a* is deactivated, and the second scan driver SD2*a* is activated. Accordingly, during the first and second holding frames HF1_1 and HF1_2, the second, third, and fifth scan signals SS2_Bi, SS3_Bi−1, and SS5_Bi that are supplied to a pixel disposed in the first display area DA1 may be activated, and the first and fourth scan signals SS1_Ai and SS4_Ai may be deactivated.

In such an embodiment, the full frame FF associated with the second display area DA2 may include a third write frame WF2_1 and a first full masking frame F_MF1. Each of the masking frames MF1 to MF3 associated with the second display area DA2 may include a partial masking frame P_MF and a second full masking frame F_MF2.

In the multi-frequency mode MFM, the first masking signal MS1 may be maintained at a first level during the third write frame WF2_1 and the first and second full masking frames F_MF1 and F_MF2. That is, the first masking signal MS1 may be deactivated during the third write frame WF2_1 and the first and second full masking frames F_MF1 and F_MF2 and may be activated within the partial masking frame P_MF. In the multi-frequency mode MFM, the second masking signal MS2 may be maintained at the first level during the third write frame WF2_1 and the partial masking frame P_MF. That is, the second masking signal MS2 may be deactivated during the third write frame WF2_1 and the partial masking frame P_MF and may be activated within the first and second full masking frames F_MF1 and F_MF2. In one embodiment, for example, the first level may be the high level. However, the first level is not limited to the high level.

Even though the third write frame WF2_1 ends and the first full masking frame F_MF1 is initiated, the first masking signal MS1 is maintained at the first level during the first full masking frame F_MF1. Afterwards, when the partial masking frame P_MF is initiated, the first masking signal MS1 transitions from the first level to a second level (e.g., the low level) in synchronization with a start time of the second display area DA2 that is driven at the second driving frequency. The first masking signal MS1 may be maintained at the second level until the partial masking frame P_MF ends. When the second full masking frame F_MF2 is initiated, the first masking signal MS1 transitions from the second level to the first level and is maintained at the first level during the second full masking frame F_MF2.

In such an embodiment, when the third write frame WF2_1 ends and the first full masking frame F_MF1 is initiated, the second masking signal MS2 may transition from the first level to the second level (e.g., the low level) in synchronization with a start time of the second display area DA2 that is driven at the second driving frequency. The second masking signal MS2 may be maintained at the second level until the first full masking frame F_MF1 ends. Afterwards, when the partial masking frame P_MF is initiated, the second masking signal MS2 may transition from the second level to the first level and may be maintained at the first level during the partial masking frame P_MF. When the second full masking frame F_MF2 is initiated, the second masking signal MS2 transitions from the first level to the second level in synchronization with a start time of the second display area DA2 that is driven at the second driving frequency. The second masking signal MS2 may be maintained at the second level until the second full masking frame F_MF2 ends.

The first and second scan drivers SD1*a* and SD2*a* are activated during the third write frame WF2_1. Accordingly, each of the first to fifth scan signals SS1_Ak, SS2_Bk, SS3_Bk−1, SS4_Ak, and SS5_Bk that are supplied to a pixel disposed in the second display area DA2 may be activated. During the first full masking frame F_MF1, the first scan driver SD1*a* is deactivated, and the second scan driver SD2*a* is activated. However, in response to the second masking signal MS2, the second masking circuit MSC2_*k* masks the second, third, and fifth scan signals SS2_Bk, SS3_Bk−1, and SS5_Bk that are activated by the k-th high-frequency driving circuit DC2_*k*. Accordingly, during the first full masking frame F_MF1, first to fifth scan signals SS1_Ak, SS2_Bk, SS3_Bk−1, SS4_Ak, and SS5_Bk are maintained in the inactive state.

During the partial masking frame P_MF of each of the masking frames MF1 to MF3, the first and second scan drivers SD1*a* and SD2*a* are activated. However, in response to the first masking signal MS1, the first masking circuit MSC1_*k* masks the first and fourth scan signals SS1_Ak and SS4_Ak that are activated by the k-th low-frequency driving circuit DC1_*k*. Accordingly, during the partial masking frame P_MF, the first and fourth scan signals SS1_Ak and SS4_Ak are maintained in the inactive state. During the partial masking frame P_MF, the second, third, and fifth scan signals SS2_Bk, SS3_Bk−1, and SS5_Bk that are activated by the k-th high-frequency driving circuit DC2_*k* may not be marked by the second masking circuit MSC2_*k* and may be supplied to a pixel of the second display area DA2.

During the second full masking frame F_MF2 of each of the masking frames MF1 to MF3, the first scan driver SD1*a* is deactivated, and the second scan driver SD2*a* is activated. However, the second, third, and fifth scan signals SS2_Bk, SS3_Bk−1, and SS5_Bk that are activated by the k-th high-frequency driving circuit DC2_*k* are masked by the second masking circuit MSC2_*k*. Accordingly, during the second full masking frame F_MF2, the first to fifth scan signals SS1_Ak, SS2_Bk, SS3_Bk−1, SS4_Ak, and SS5_Bk are maintained in the inactive state.

Accordingly, even though the second display area DA2 operates at the second driving frequency lower than the first driving frequency, during the partial masking frame P_MF, the first and fourth scan signals SS1_Ai and SS4_Ai are maintained in the inactive state. During the partial masking frame P_MF, the second, third, and fifth scan signals SS2_Bi, SS3_Bi−1, and SS5_Bi may be activated within the inactive period NAP of the light-emitting control signal EMi. During the partial masking frame P_MF, the third and fourth transistors T3 and T4 may be turned on by the second and third scan signals SS2_Bi and SS3_Bi−1 such that the initialization voltage VINT is applied to the second electrode of the first transistor T1. Accordingly, a potential of the second electrode of the first transistor T1 may decrease to the initialization voltage VINT in each partial masking frame P_MF, and thus, the issue that luminance of the light-emitting element ED decreases in the masking frames MF1 to MF3 may be improved.

In such an embodiment, during the partial masking frame P_MF, the sixth transistor T6 may drain (or disperse) a part of the minimum current of the first transistor T1 to a current path, which is different from a current path to the light-emitting element ED, as the bypass current Ibp. Accordingly, in the respective masking frames MF1 to MF3, a contrast ratio may be improved by implementing an accurate black luminance image by using the sixth transistor T6.

An embodiment having a structure in which the low-frequency driving stages SRC1_*i* to SRC1_*k* respectively include the low-frequency masking circuits MSC1_*i* to MSC1_*k* and the high-frequency driving states SRC2_*i* to SRC2_*k* respectively include high-frequency masking circuits MSC2_*i* to MSC2_*k* is illustrated in FIGS. 12 and 13, but the disclosure is not limited to the structure including a masking circuit. In one alternative embodiment, for example, masking of an output of a low-frequency scan signal may be accomplished by controlling the input of a control signal (e.g., a clock signal) to the low-frequency driving stages SRC1_*i* to SRC1_*k*. In such an embodiment, the low-frequency driving stages SRC1_*i* to SRC1_*k* may not include the low-frequency masking circuits MSC1_*i* to MSC1_*k*. Alternatively, masking of an output of a high-frequency scan signal may be accomplished by controlling the input of a control signal (e.g., a clock signal) to the high-frequency driving stages SRC2_*i* to SRC2_*k*. In such an embodiment, the high-frequency driving stages SRC2_*i* to SRC2_*k* may not include the high-frequency masking circuits MSC2_*i* to MSC2_*k*.

In embodiments of the invention, as described herein, a display device may drive a display panel at a first panel frequency in a first driving mode and may drive the display panel at a second panel frequency lower than the first panel frequency in a second driving mode. In such embodiments, in the second driving mode, a pixel may receive a scan signal activated at a first frequency and a scan signal activated at the second frequency higher than the first frequency. As the compensation for the decrease in luminance occurring when the display panel is driven at a low frequency is performed, the display quality of the display device may be improved.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:
a display panel including a pixel; and
a panel driver which drives the display panel at a first panel frequency in a first driving mode and drives the display panel at a second panel frequency lower than the first panel frequency in a second driving mode,
wherein the pixel includes:
a light-emitting element including a cathode and an anode;
a first transistor connected between a power line and the anode of the light-emitting element;
a second transistor which is connected between a data line and a first electrode of the first transistor and receives a first scan signal;
a third transistor which is connected between a second electrode of the first transistor and a first node and receives a second scan signal;
a fourth transistor which is connected between the first node and an initialization line and receives a third scan signal; and
a fifth transistor which is connected between a gate electrode of the first transistor and the first node and receives a fourth scan signal,
wherein, in the second driving mode, the first and fourth scan signals are simultaneously activated, and
wherein, in the second driving mode, a period of the second scan signal is smaller than or equal to a period of the fourth scan signal.

2. The display device of claim 1,
wherein, in the second driving mode, the period of the second scan signal is equal to a period of the third scan signal, and
wherein, in the second driving mode, a period of the first scan signal is equal to the period of the fourth scan signal.

3. The display device of claim 1, wherein the pixel further includes:
a sixth transistor which is connected between the initialization line and the anode of the light-emitting element and receives a fifth scan signal.

4. The display device of claim 3,
wherein an active period of the second scan signal overlaps an active period of the third scan signal, and
wherein the third scan signal is activated prior to the second scan signal.

5. The display device of claim 4,
wherein, in the second driving mode, the display panel displays an image during a plurality of panel frames,
wherein each of the panel frames includes a write frame and a holding frame,
wherein, during the write frame, each of the first to fifth scan signals is activated, and
wherein, during the holding frame, the second, third, and fifth scan signals are activated, and the first and fourth scan signals are deactivated.

6. The display device of claim 5, wherein, during the write frame, active periods of the first and fourth scan signals overlap active periods of the second, third, and fifth scan signals.

7. The display device of claim 6, wherein the write frame includes:
a first period in which the third scan signal is activated, and the first, second, fourth, and fifth scan signals are deactivated;
a second period in which the first to fifth scan signals are activated; and a third period in which the first, second, fourth, and fifth scan signals are activated, and the third scan signal is deactivated.

8. The display device of claim 5, wherein the second and fifth scan signals are simultaneously activated.

9. The display device of claim 3, wherein the pixel further includes:

a first light-emitting control transistor connected between the power line and the first electrode of the first transistor; and a second light-emitting control transistor connected between the second electrode of the first transistor and the anode of the light-emitting element.

10. The display device of claim 9, wherein each of the first and second light-emitting control transistors receives a light-emitting control signal.

11. The display device of claim 10, wherein, in the second driving mode, the display panel displays an image during a plurality of panel frames, wherein each of the panel frames includes a write frame and a holding frame, wherein, during the write frame, each of the first to fifth scan signals is activated, wherein, during the holding frame, the second, third, and fifth scan signals are activated, and the first and fourth scan signals are deactivated, and wherein, during the write frame, an inactive period of the light-emitting control signal overlaps an active period of each of the first to fifth scan signals.

12. The display device of claim 9, wherein the first light-emitting control transistor receives a first light-emitting control signal, wherein the second light-emitting control transistor receives a second light-emitting control signal, and wherein the first light-emitting control signal is activated prior to the second light-emitting control signal.

13. The display device of claim 12, wherein, in the second driving mode, the display panel displays an image during a plurality of panel frames, wherein each of the panel frames includes a write frame and a holding frame, wherein, during the write frame, each of the first to fifth scan signals is activated, wherein, during the holding frame, the second, third, and fifth scan signals are activated, and the first and fourth scan signals are deactivated, and wherein the write frame includes:

an overlapping period in which an inactive period of the first light-emitting control signal and an inactive period of the second light-emitting control signal overlap each other; and a non-overlapping period in which the inactive period of the first light-emitting control signal and the inactive period of the second light-emitting control signal do not overlap each other.

14. The display device of claim 13, wherein the overlapping period overlaps an active period of each of the first to fifth scan signals.

15. The display device of claim 13, wherein each of the second, third, and fifth scan signals includes a first sub-active period activated within the non-overlapping period and a second sub-active period activated within the overlapping period.

16. The display device of claim 1, wherein the panel driver includes:

a first scan driver which operates at a first frequency and to output the first and fourth scan signals; and a second scan driver which operates at a second frequency higher than the first frequency and to output the second and third scan signals.

17. The display device of claim 16, wherein, in the first driving mode, the first frequency is equal to the first panel frequency, and the second frequency is higher than or equal to the first panel frequency, and wherein, in the second driving mode, the first frequency is equal to the second panel frequency, and the second frequency is higher than the second panel frequency.

18. A display device comprising:

a display panel including a first display area, a second display area adjacent to the first display area, low-frequency scan lines disposed in the first and second display areas, and high-frequency scan lines disposed in the first and second display areas; and a panel driver which operates the first display area at a first driving frequency and operates the second display area at a second driving frequency different from the first driving frequency, wherein the panel driver includes:

a first scan driver which operates at a first frequency and is connected to the low-frequency scan lines; and a second scan driver which operates at a second frequency higher than the first frequency and is connected to the high-frequency scan lines, wherein the first frequency is equal to the first driving frequency, wherein the display panel includes a plurality of pixels arranged in the first and second display areas, and wherein each of the pixels includes a light-emitting element and a pixel circuit unit connected to the light-emitting element, wherein the pixel circuit unit is connected to at least one of the low-frequency scan lines and at least one of the high-frequency scan lines.

19. The display device of claim 18, wherein the light-emitting element including a cathode and an anode, and wherein the pixel circuit unit includes:

a first transistor connected between a power line and the anode of the light-emitting element;

a second transistor which is connected between a data line and a first electrode of the first transistor and receives a first scan signal from the first scan driver;

a third transistor which is connected between a second electrode of the first transistor and a first node and receives a second scan signal from the second scan driver;

a fourth transistor which is connected between the first node and an initialization line and receives a third scan signal from the second scan driver; and a fifth transistor which is connected between a gate electrode of the first transistor and the first node and receives a fourth scan signal from the first scan driver.

20. The display device of claim 19, wherein the first scan driver includes:

a first driving circuit which outputs the first and fourth scan signals; and a first masking circuit connected with the first driving circuit, wherein the first masking circuit selectively masks the first and fourth scan signals in response to a first masking signal, and wherein the second scan driver includes:

a second driving circuit which outputs the second and third scan signals; and a second masking circuit connected with the second driving circuit, wherein the second masking circuit selectively masks the second and third scan signals in response to a second masking signal.

* * * * *